April 24, 1962  H. C. SHANK, JR  3,031,370
MACHINE FOR DECORATING GLASS ARTICLES
Filed Aug. 27, 1959  22 Sheets-Sheet 1
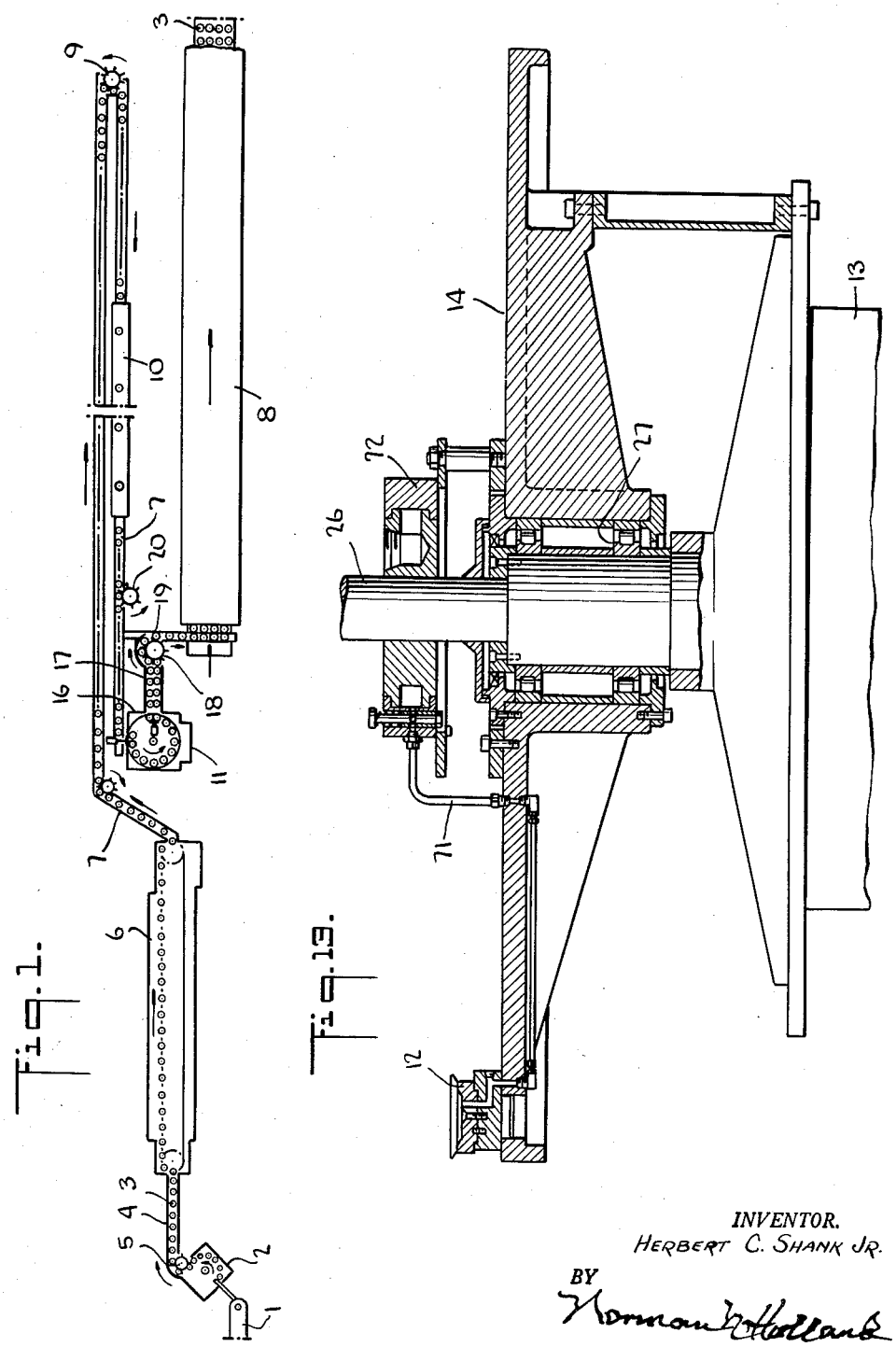
INVENTOR.
HERBERT C. SHANK JR.
BY
ATTORNEY April 24, 1962 H. C. SHANK, JR 3,031,370
MACHINE FOR DECORATING GLASS ARTICLES
Filed Aug. 27, 1959 22 Sheets-Sheet 2
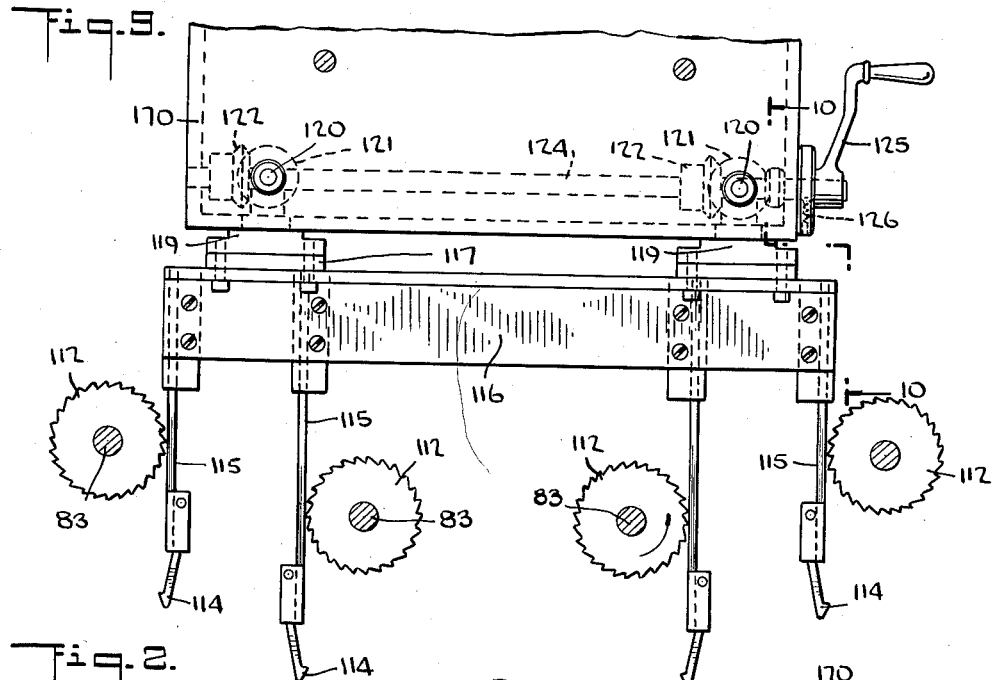
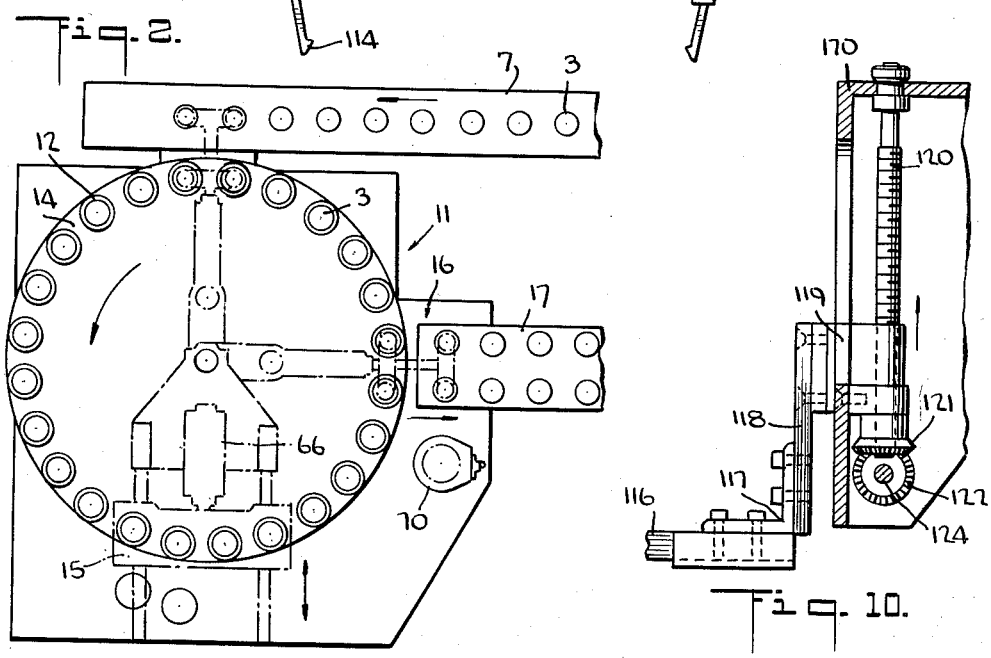
INVENTOR.
HERBERT C. SHANK JR.
BY
ATTORNEY April 24, 1962  H. C. SHANK, JR  3,031,370
MACHINE FOR DECORATING GLASS ARTICLES
Filed Aug. 27, 1959  22 Sheets-Sheet 3

INVENTOR.
HERBERT C. SHANK JR.
BY
ATTORNEY

INVENTOR.
HERBERT C. SHANK JR.
ATTORNEY

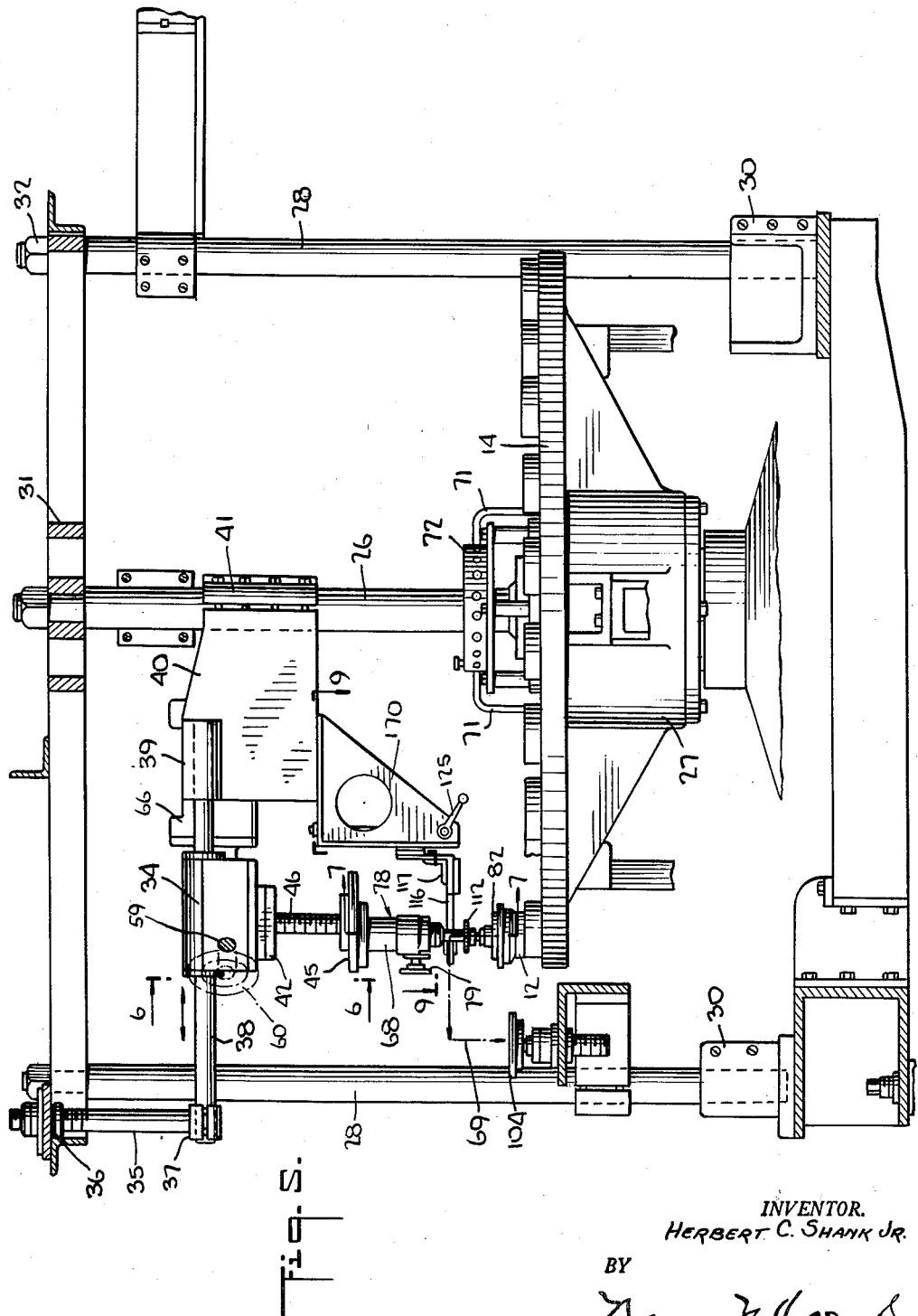

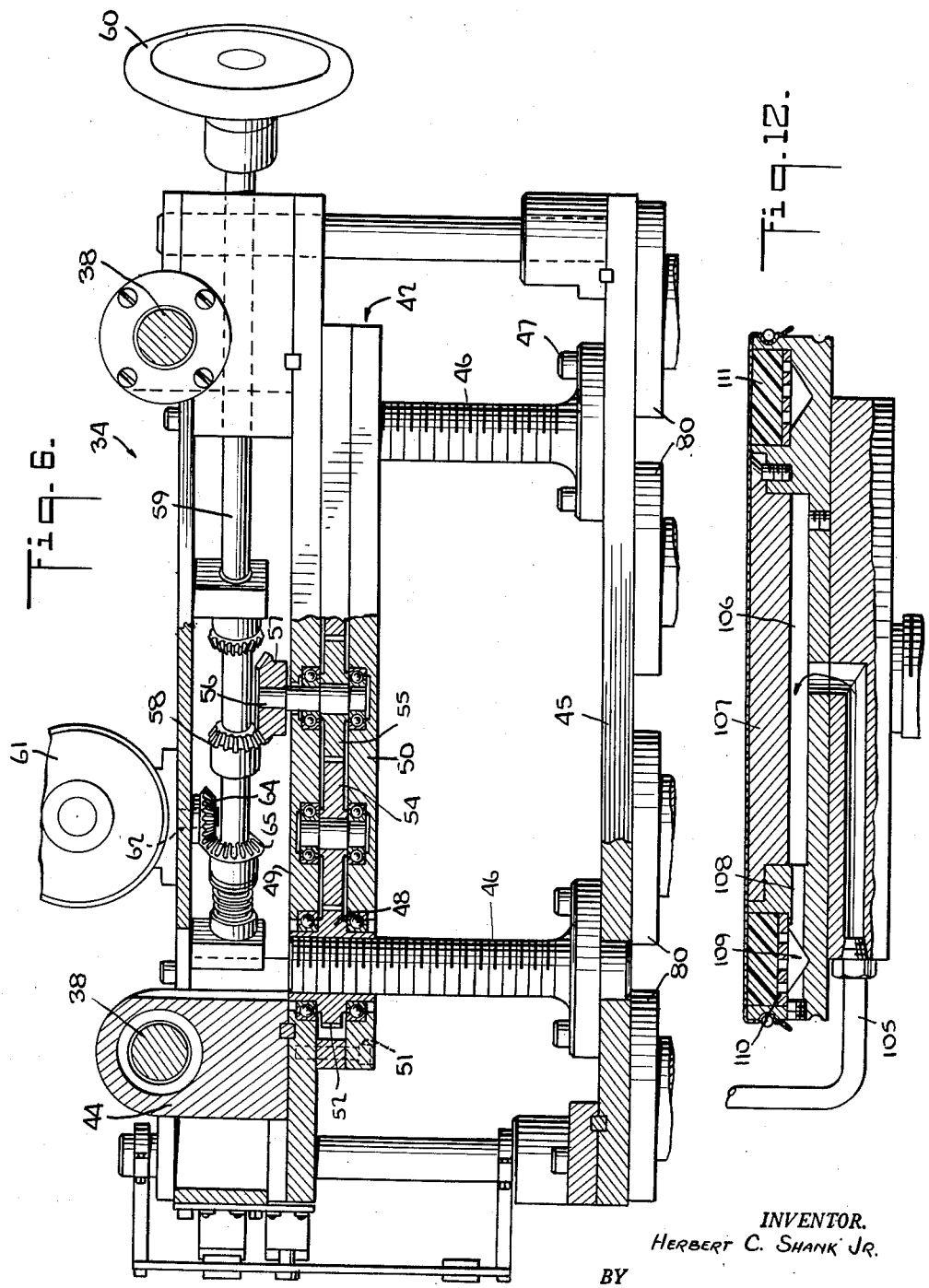

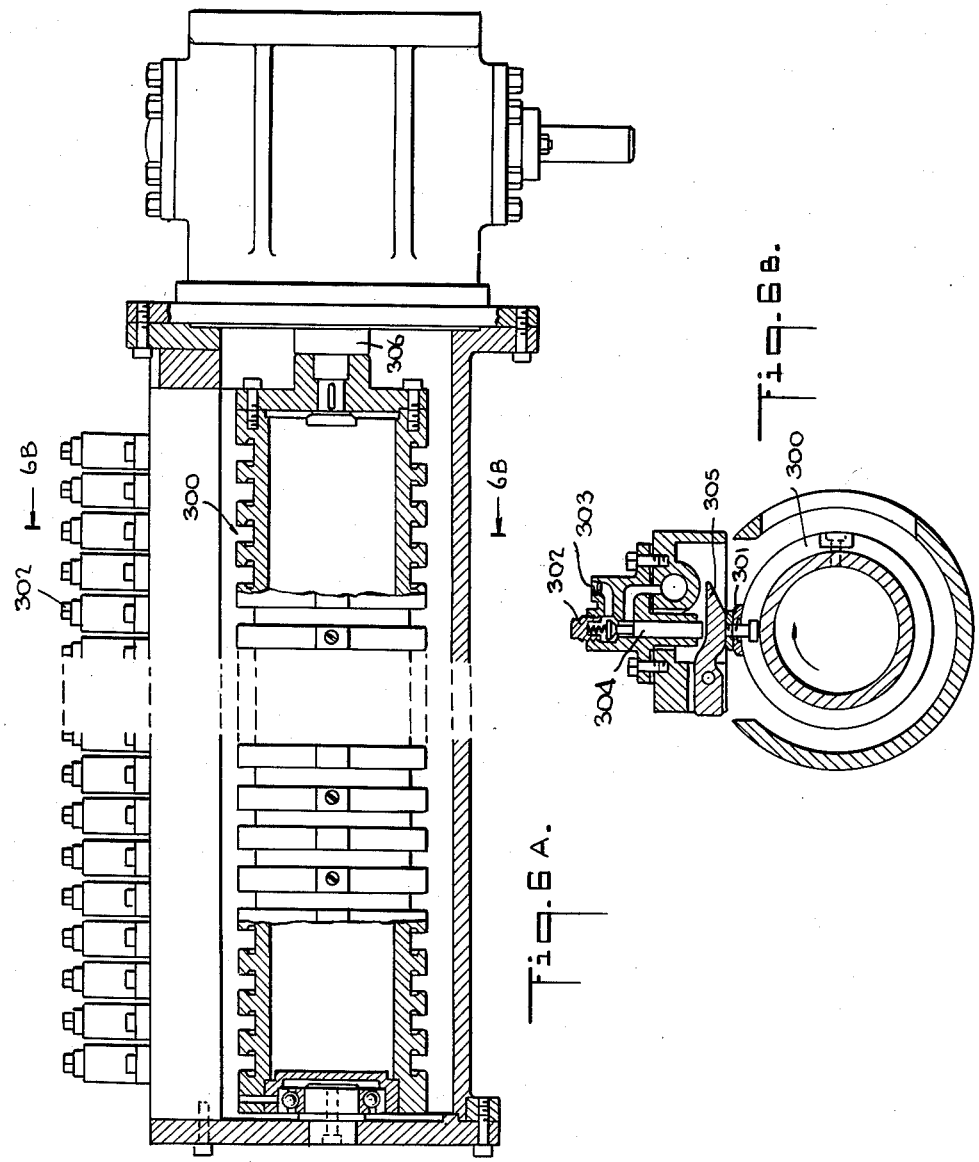

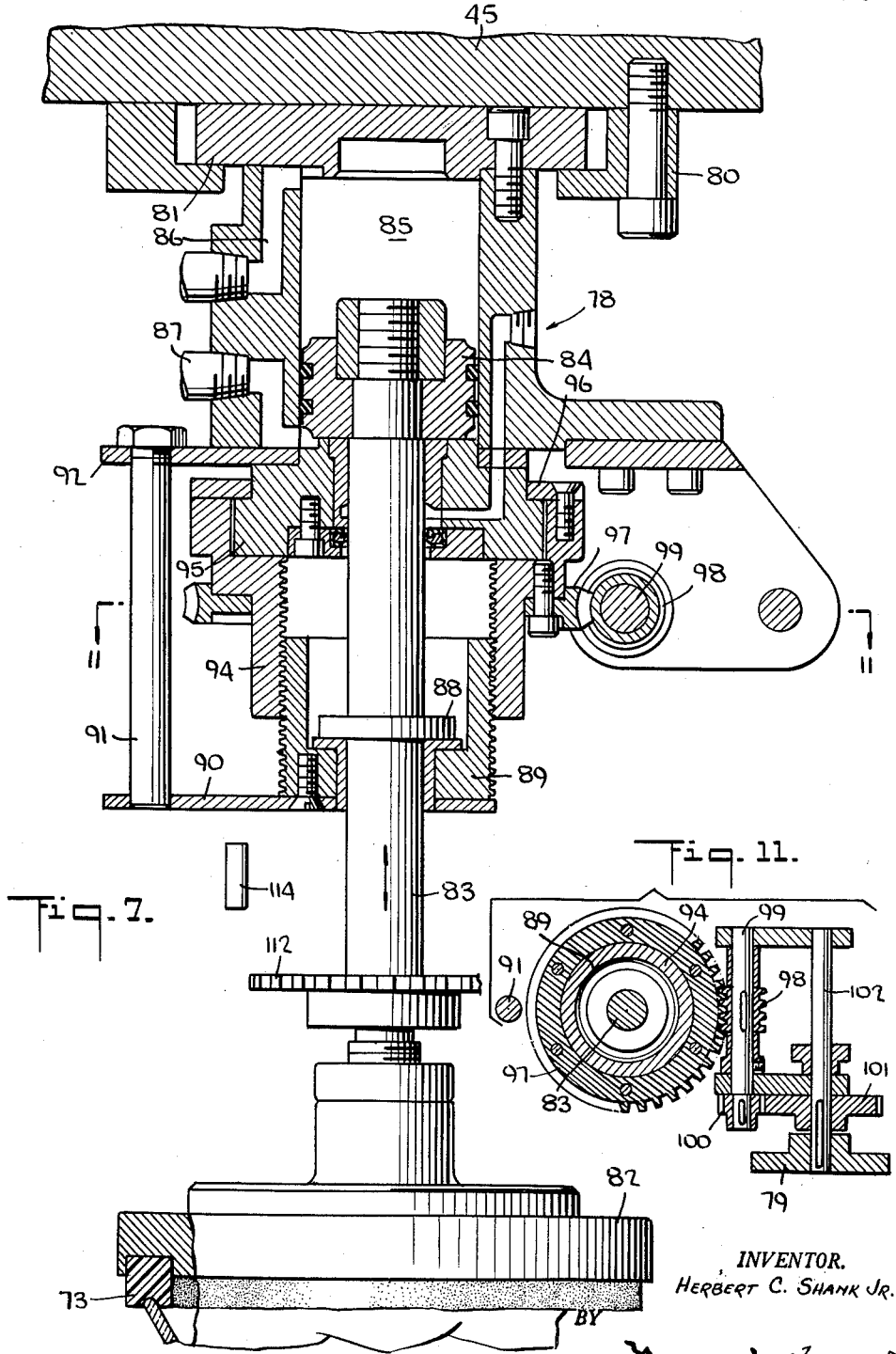

April 24, 1962  H. C. SHANK, JR  3,031,370
MACHINE FOR DECORATING GLASS ARTICLES
Filed Aug. 27, 1959  22 Sheets-Sheet 9

*INVENTOR.*
*HERBERT C. SHANK JR.*
BY
*ATTORNEY*

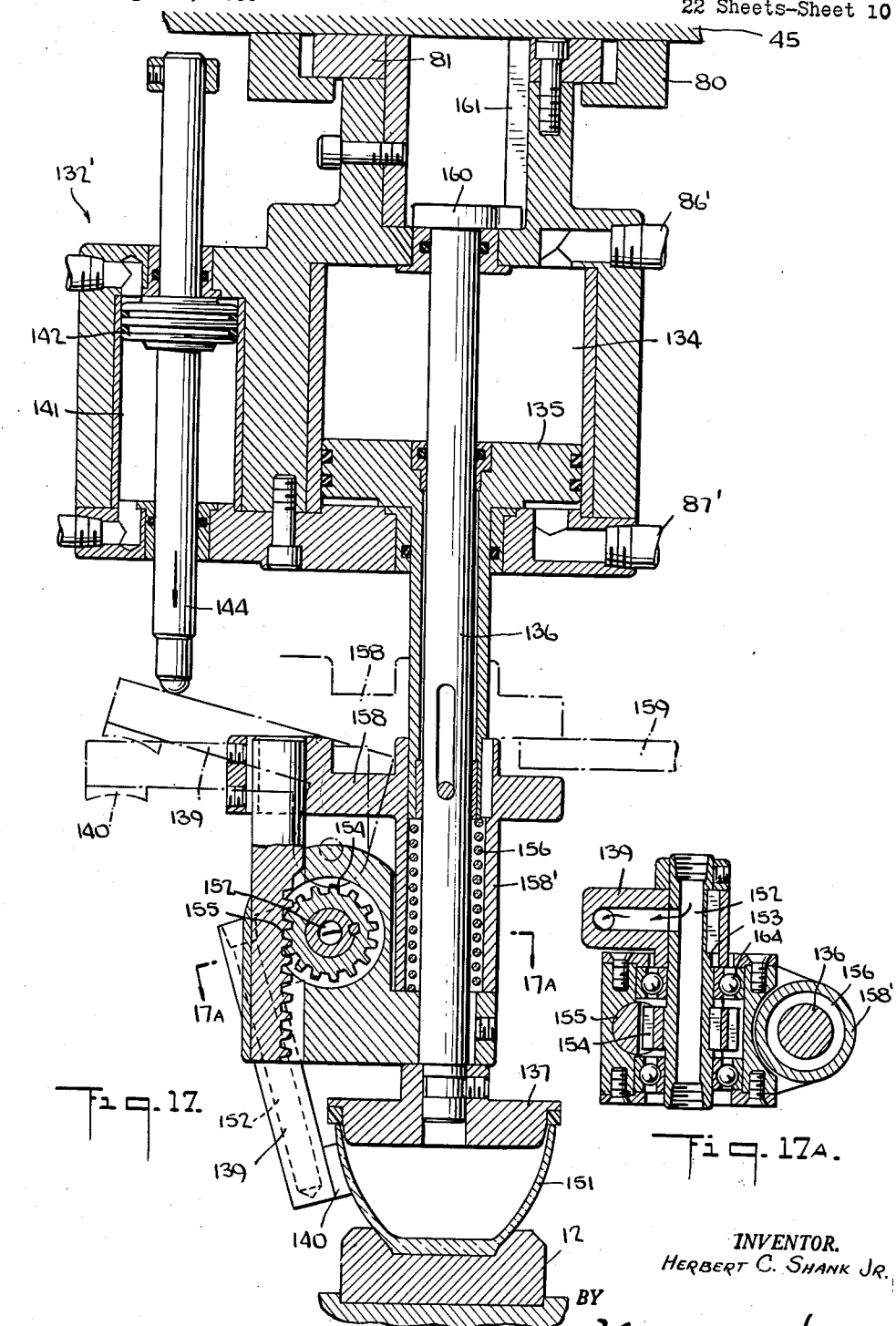

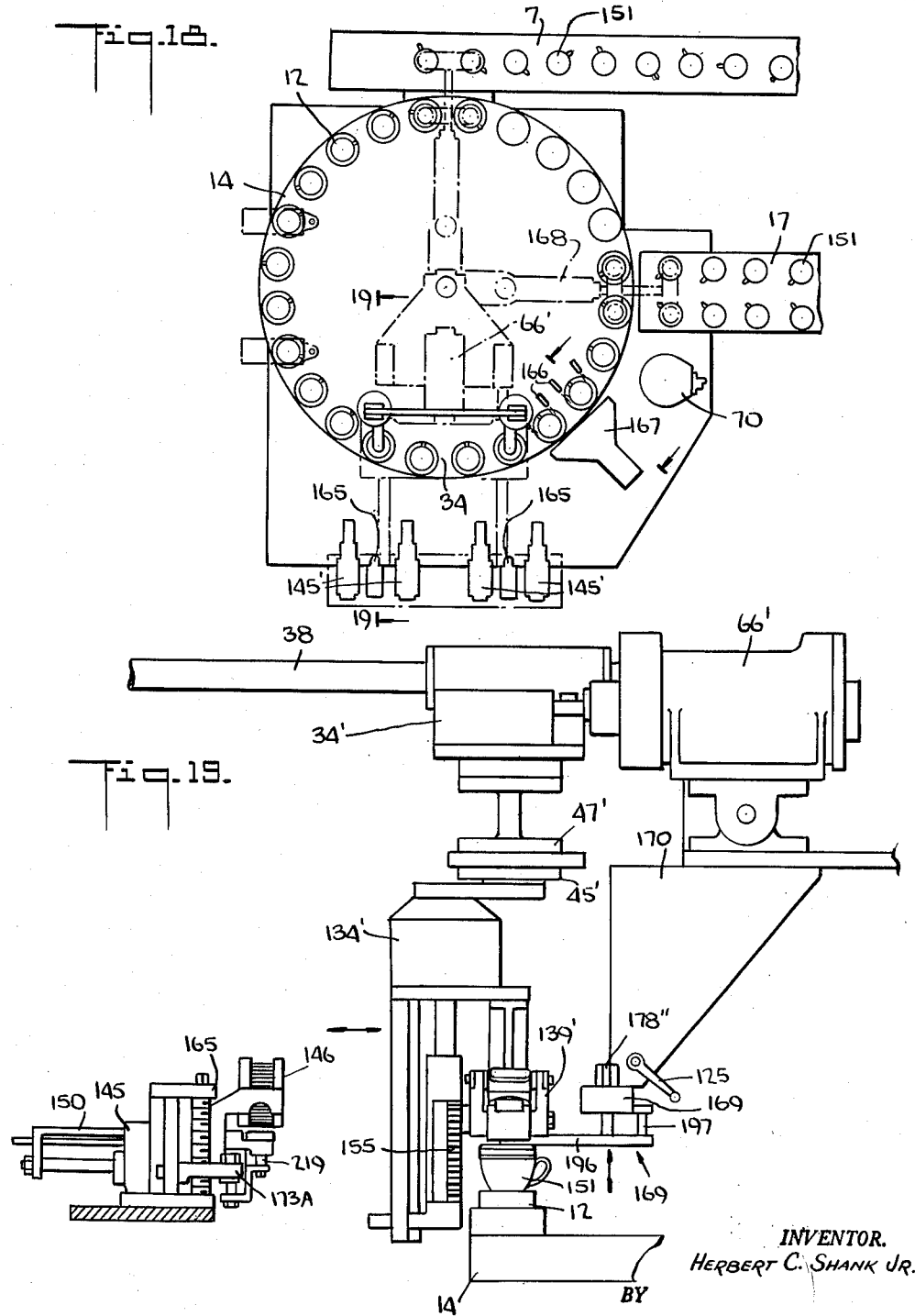

April 24, 1962
H. C. SHANK, JR
3,031,370
MACHINE FOR DECORATING GLASS ARTICLES
Filed Aug. 27, 1959
22 Sheets-Sheet 12
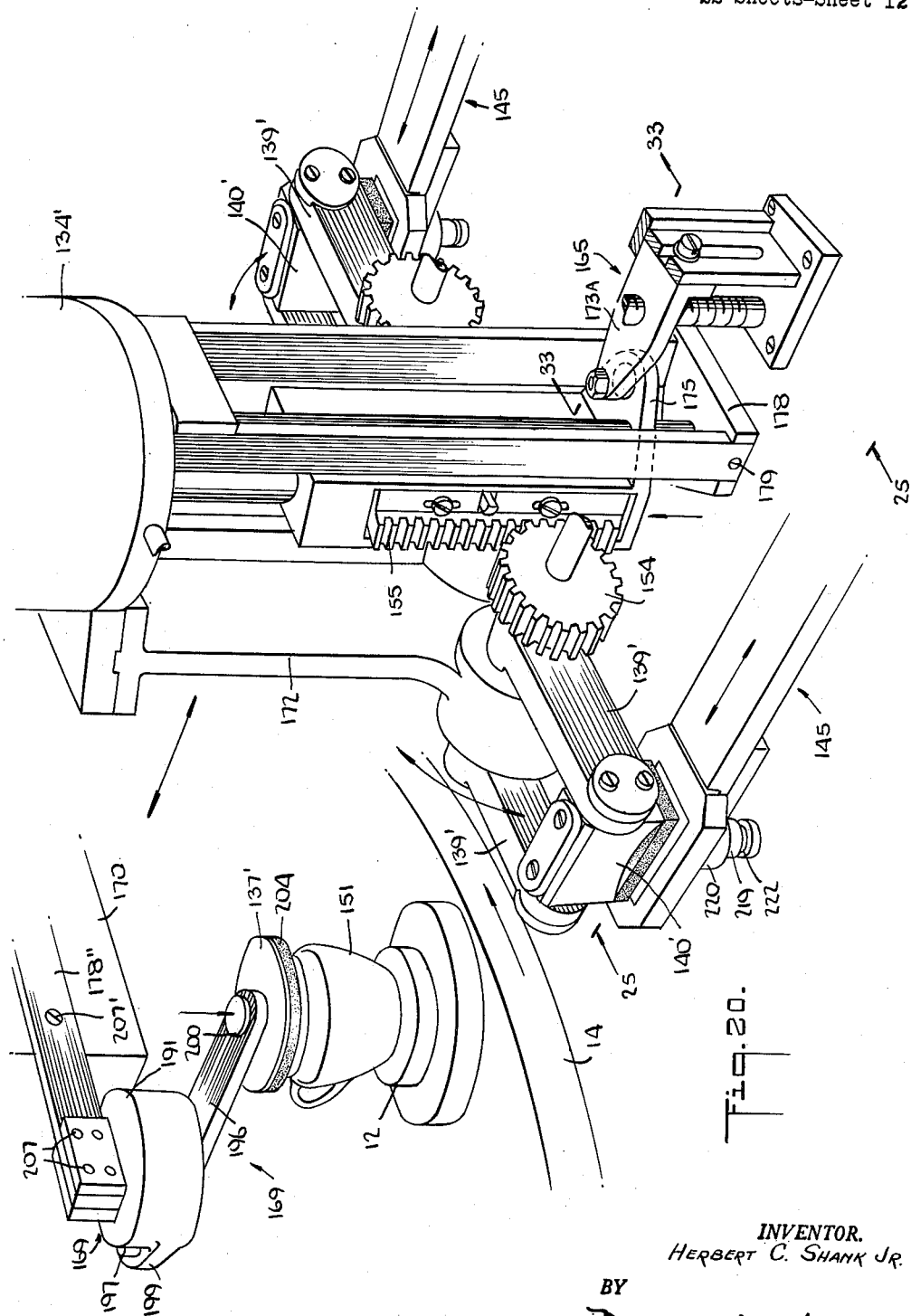
INVENTOR.
HERBERT C. SHANK JR.
BY
*Norman N. Holland*
ATTORNEY

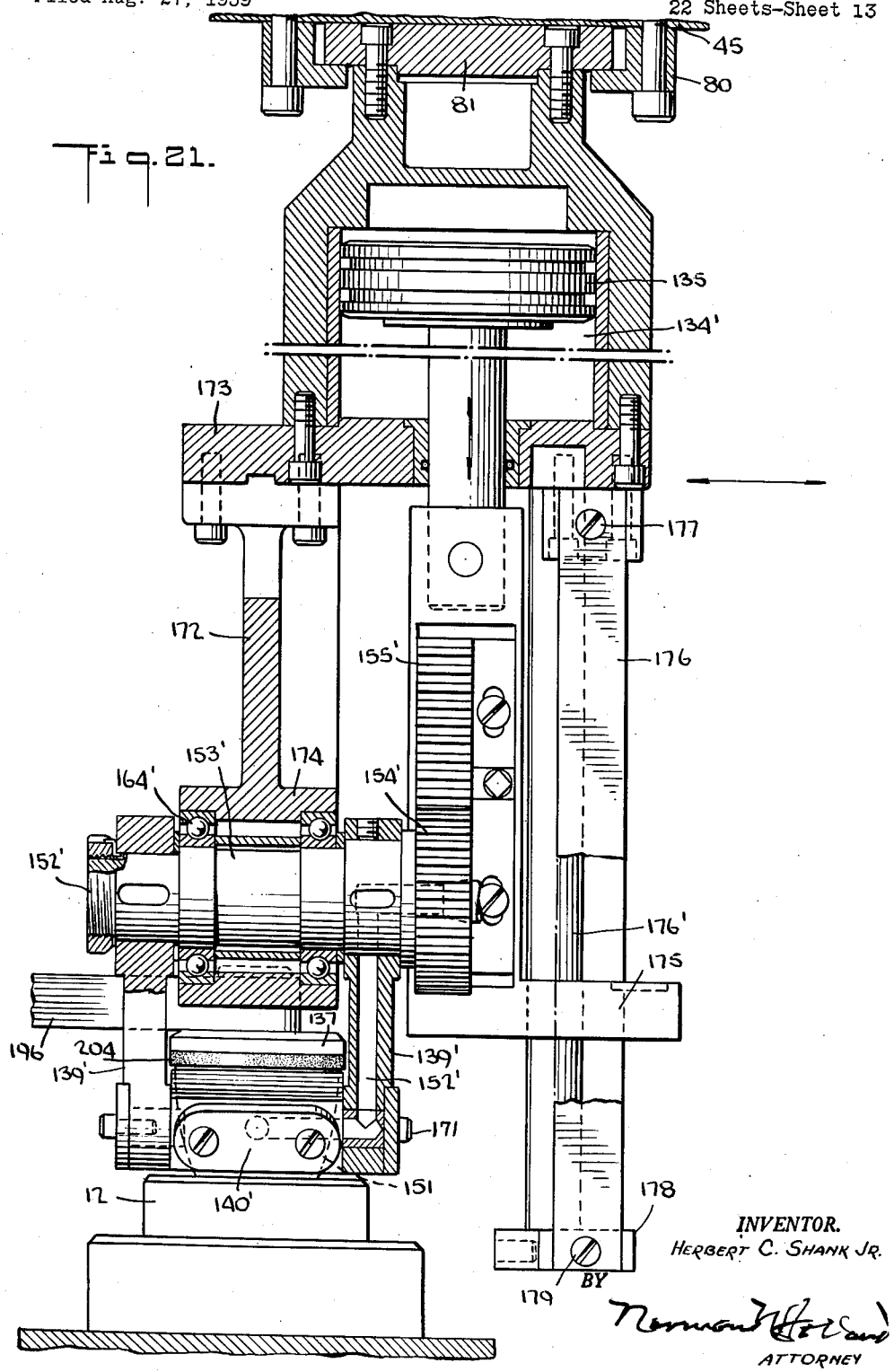

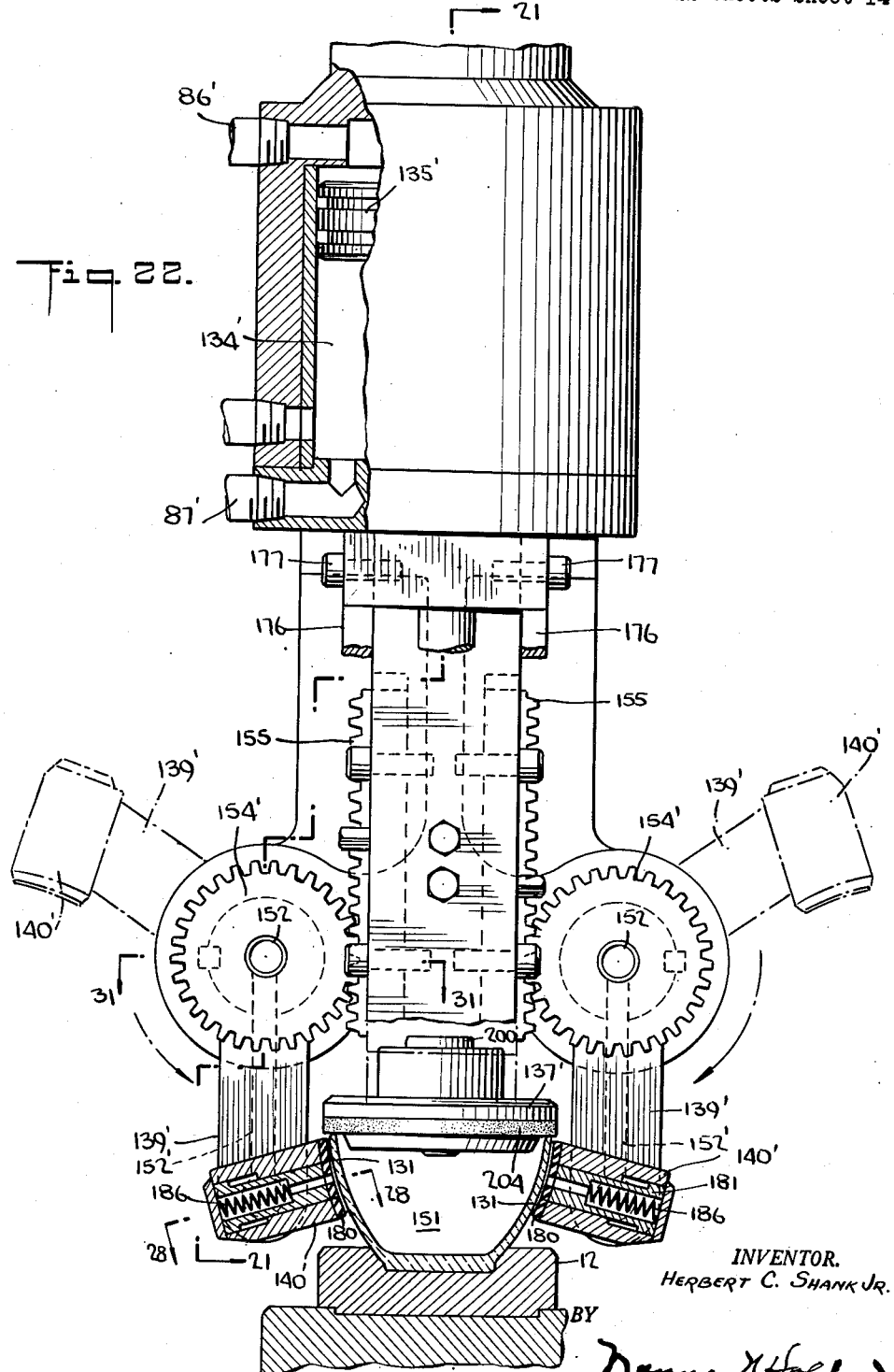

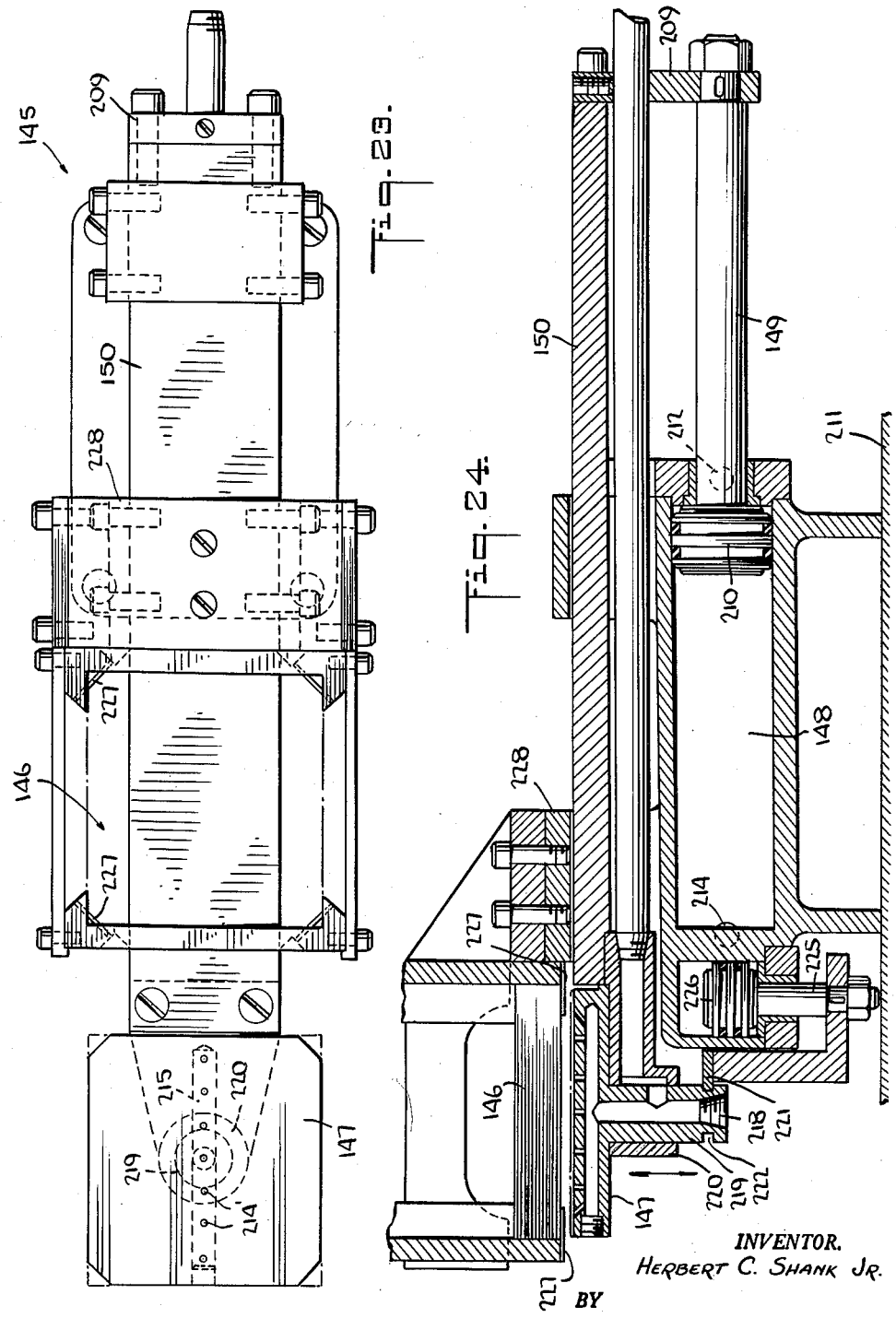

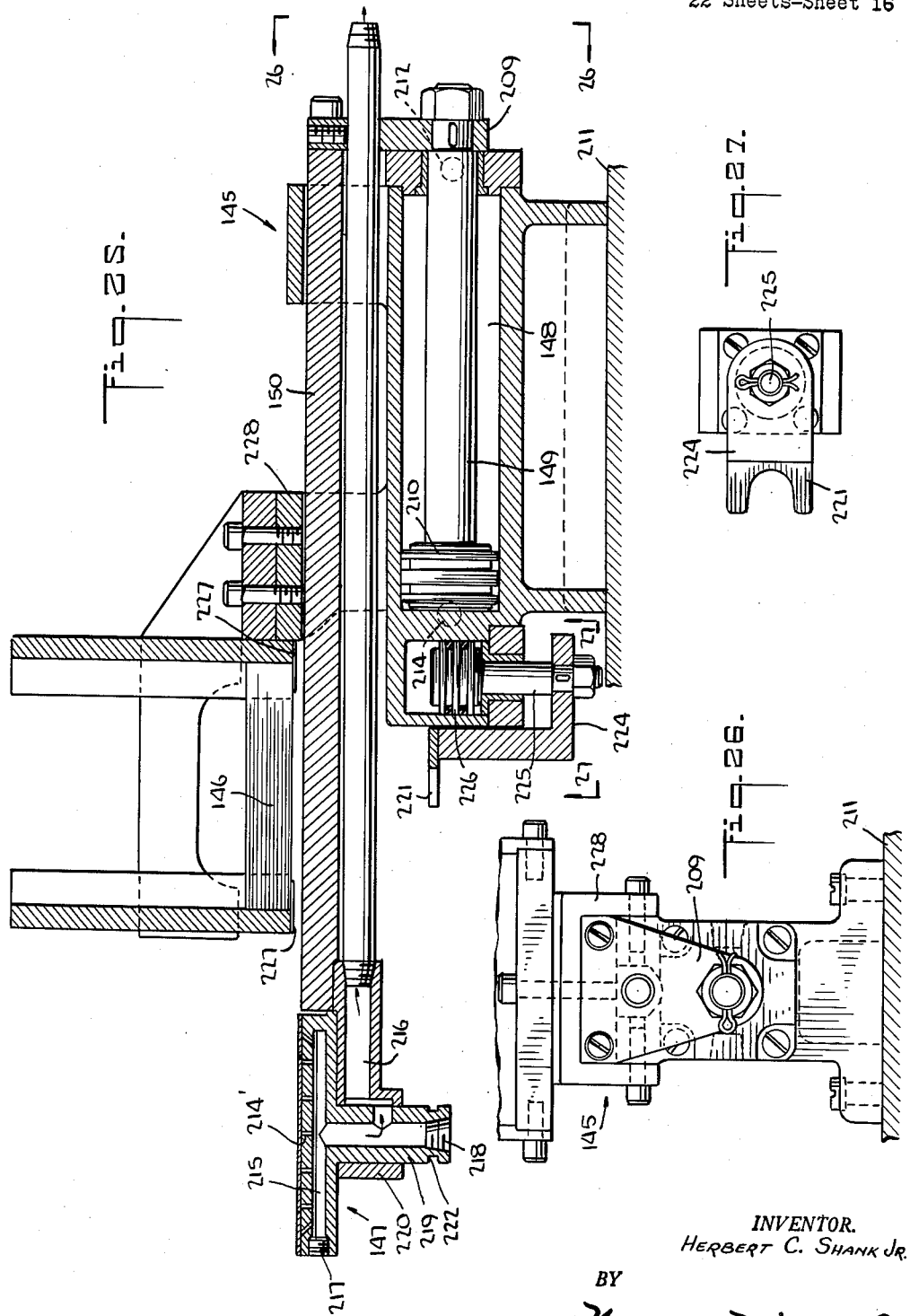

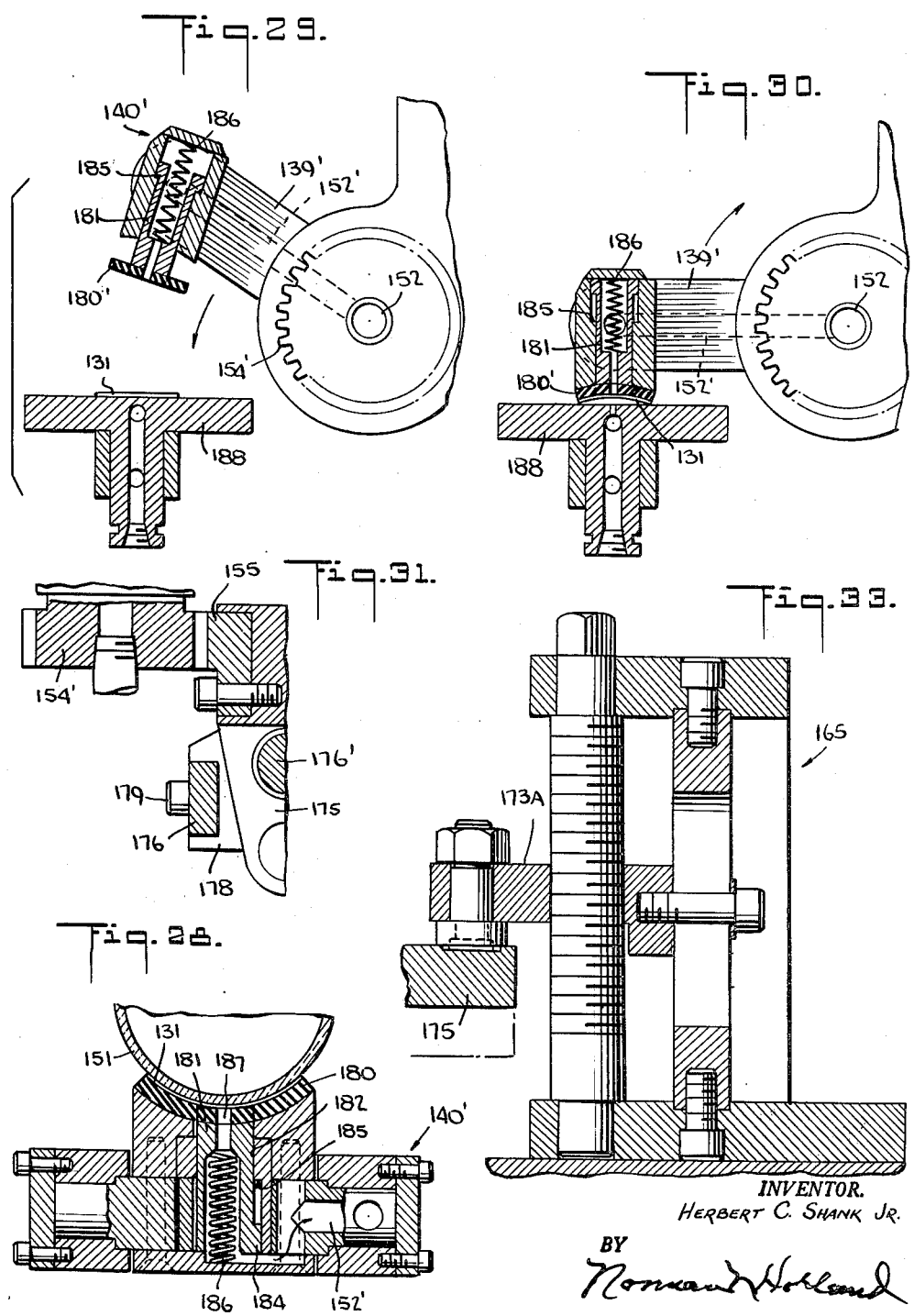

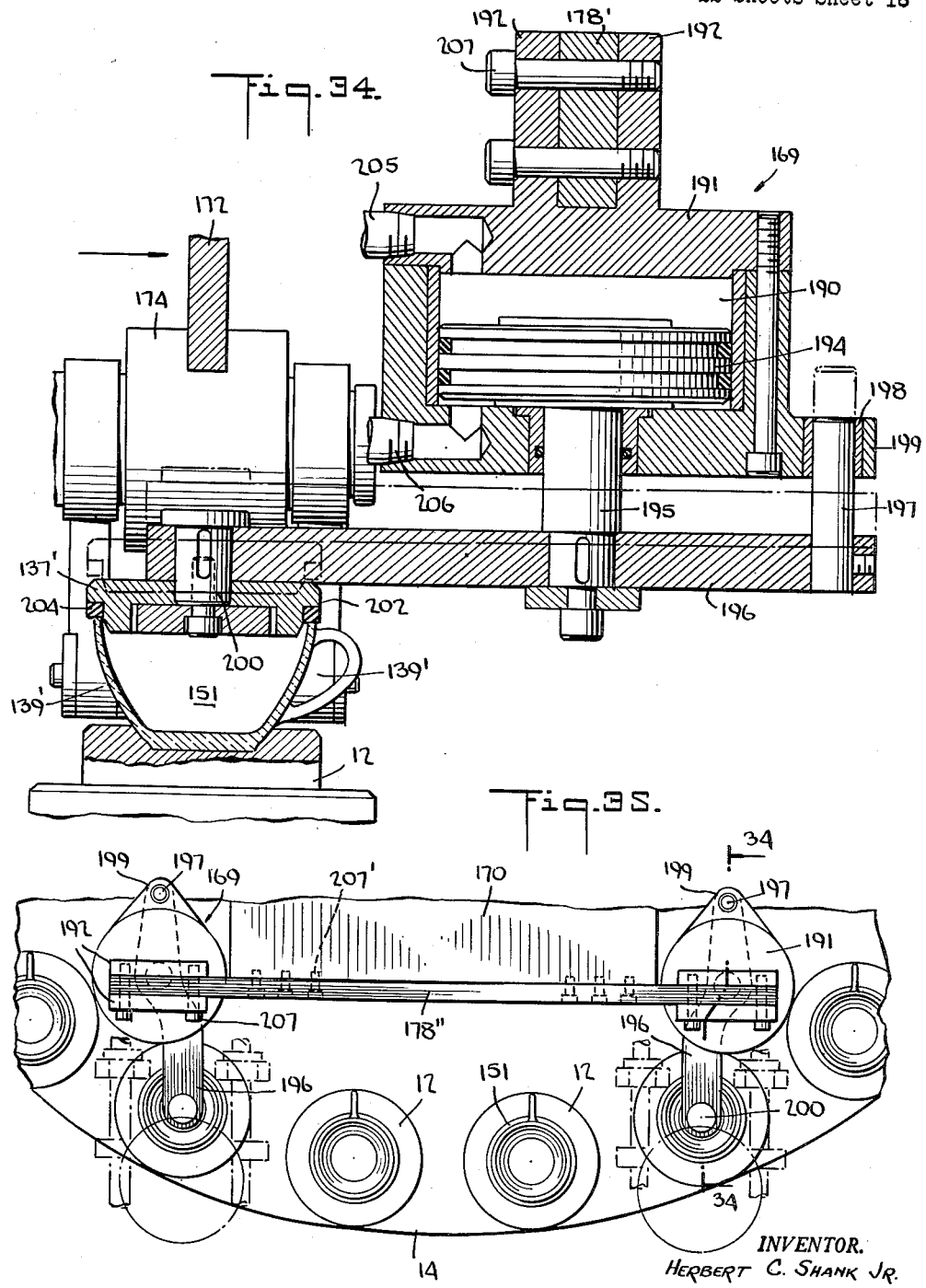

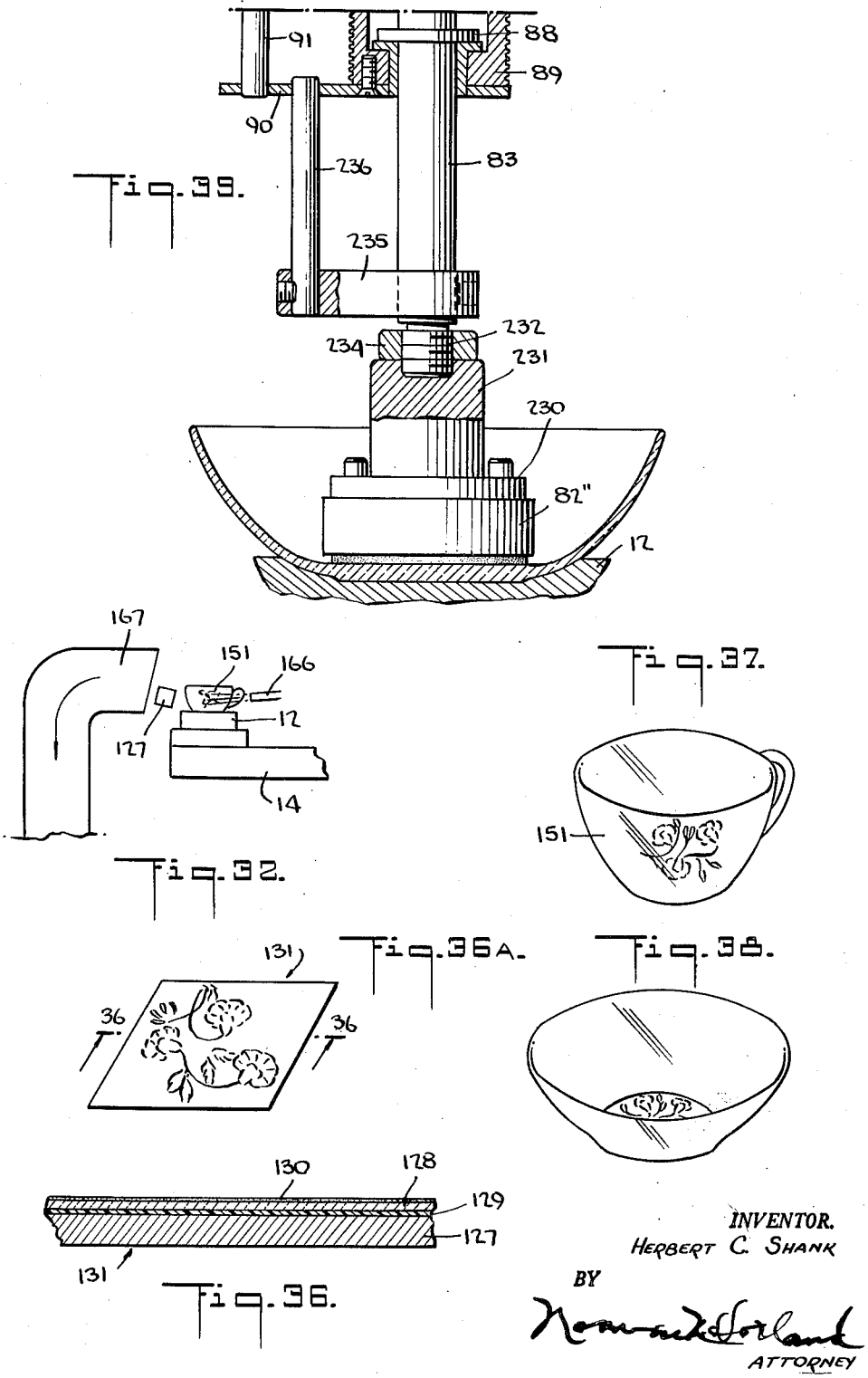

April 24, 1962  H. C. SHANK, JR  3,031,370
MACHINE FOR DECORATING GLASS ARTICLES
Filed Aug. 27, 1959  22 Sheets-Sheet 20
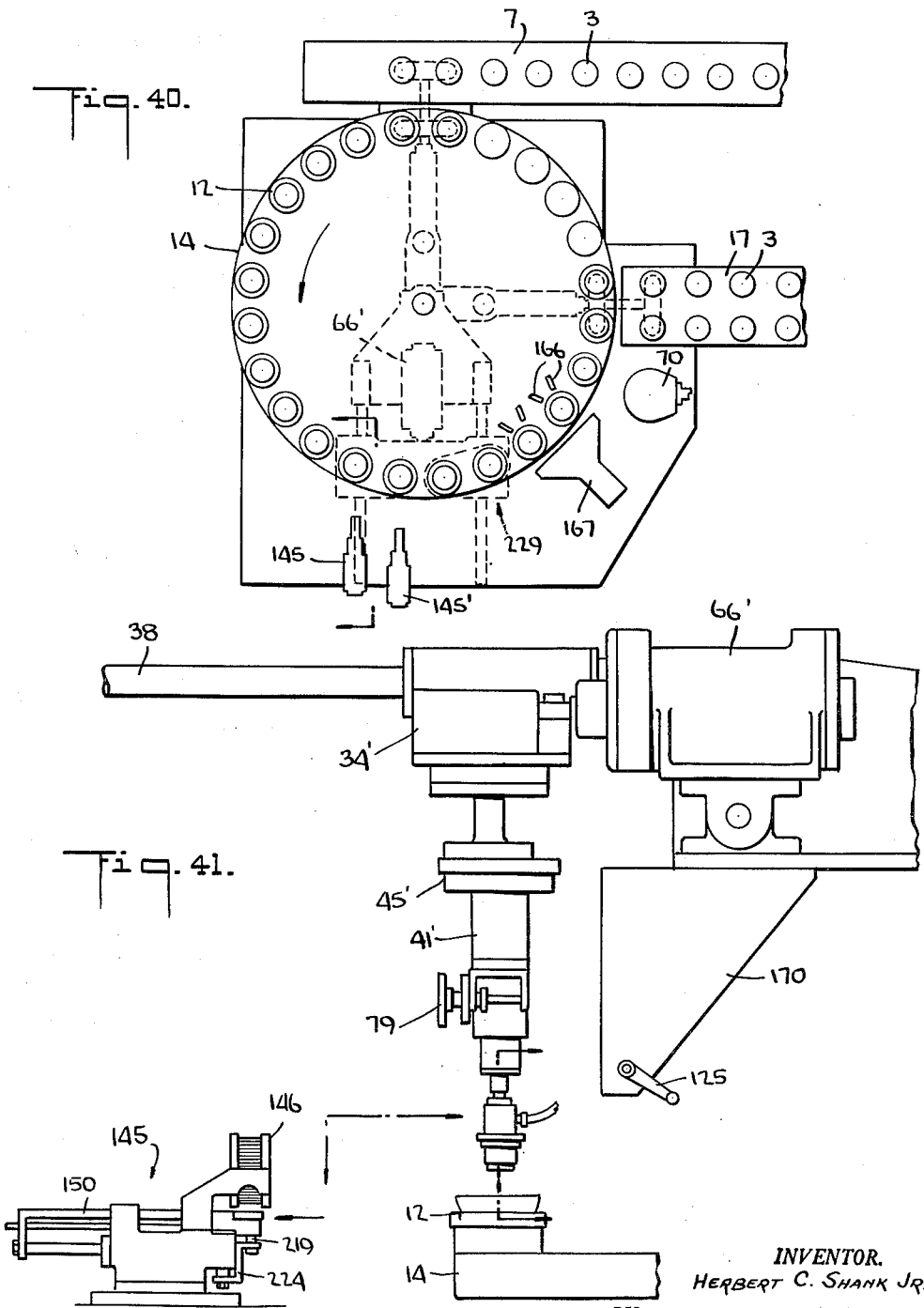
INVENTOR.
HERBERT C. SHANK JR.
BY Norman Holland
ATTORNEY April 24, 1962   H. C. SHANK, JR   3,031,370
MACHINE FOR DECORATING GLASS ARTICLES
Filed Aug. 27, 1959   22 Sheets-Sheet 21

INVENTOR.
Herbert C. Shank Jr.
BY
Norman H. Howard
ATTORNEY

April 24, 1962   H. C. SHANK, JR   3,031,370
MACHINE FOR DECORATING GLASS ARTICLES
Filed Aug. 27, 1959   22 Sheets-Sheet 22

INVENTOR.
HERBERT C. SHANK JR.
BY
Norman Holland
ATTORNEY

United States Patent Office 3,031,370
Patented Apr. 24, 1962

---

3,031,370
MACHINE FOR DECORATING GLASS ARTICLES
Herbert C. Shank, Jr., Lancaster, Ohio, assignor to Anchor Hocking Glass Corporation, Lancaster, Ohio, a corporation of Delaware
Filed Aug. 27, 1959, Ser. No. 836,487
9 Claims. (Cl. 156—559)

The present invention relates to a machine for decorating glass or similar articles and more particularly to a machine which may be utilized in a glass manufacturing line without slowing the operations of the other machines in the line.

Glass articles are made by mass production methods and sold at low cost. Various types may be bought at low prices in chain store syndicates. Attractive decorations fused and permanently fixed to the surface add to the beauty of the articles and increase the demand and the use for them. Unless the cost of the decorations can be kept at a minimum, consumers will not pay the extra cost on a relatively inexpensive article, and in many cases, will buy articles made of other materials thus causing loss to the manufacturer of the decorated ware.

The present invention aims to provide an inexpensive, automatic machine which may be utilized in line with other automatic glass machinery without slowing the speed of production of the other machines in the line. In the usual manufacture of glass articles, molten glass charges or gobs are fed to fabricating machines which mold the glass to the particular shape and deliver it for transfer to conveyors while at a high temperature, for example, 900° or 1000° F. A conveyor moves the ware through a so-called glazer which applies flames to the surface to polish the surface and then the ware is conveyed to a lehr where it is annealed. The annealed ware is then inspected and packed.

The provision of a decorating machine which will fit into such a line without slowing the operation of the fabricating machine, the glazer or the lehr will reduce the cost of applying decorations because it is merely another machine in the line. Operators who look after the other machinery may look after the decorating machine at the same time.

An object of the present invention is to provide a machine which will fit into a glass line without decreasing the speed of operation of other machinery in the line.

Another object of the invention is to provide a machine for decorating in which the paper or other type backing for the decorating is removed from the glass article leaving the ceramic color thereon thereby avoiding combustion of the paper when the ware passes through a lehr.

Another object of the invention is to provide a machine for utilizing the residual heat in the ware to bond the color design to the articles.

Another object of the invention is to provide a machine which automatically releases the paper or other backing from the color design by the utilization of the residual heat in the article.

Another object of the invention is to provide a machine for fusing the ceramic color design by increasing the temperature of the lehr in the front end thereof so that a fusing temperature substantially higher than the annealing temperature is reached.

Another object of the invention is to provide a machine which may be placed in the glass line between the fabricating or molding machine and the annealing lehr.

Another object of the invention is to provide an automatic machine adapted to utilize different mechanisms for different types of decorations.

Another object of the invention is to provide a machine which may be quickly changed from one type or design of decoration to another.

Another object of the invention is to provide a machine which may be quickly changed for use on different sizes, shapes, and heights of glass articles.

Another object of the invention is to provide a machine which may be quickly adjusted for application of decorations to bottoms, sides, or rims of glass articles.

Other and further objects of the invention will be obvious upon an understanding of the illustrative embodiment about to be described, or will be indicated in the appended claims and various advantages not referred to herein will occur to one skilled in the art upon employment of the invention in practice.

A preferred embodiment of the invention has been chosen for purposes of illustration and description and is shown in the accompanying drawings wherein:

FIG. 1 is a diagrammatic view illustrating a glass line embodying the present invention and illustrating a preferred embodiment of the decorating machine utilized therein according to the present invention;

FIG. 2 is an enlarged view of a portion of the glass line shown in FIG. 1 including a diagrammatic showing of the decorating machine;

FIG. 5 is a sectional view along the line 5—5 of FIG. 3 showing a portion of the preferred embodiment of the decorating machine;

FIG. 6 is a front elevational view partly in section taken along the line 6—6 of FIG. 5 of the carriage of the decorating machine;

FIG. 6A is a sectional side view of a timer which may be used with the present invention;

FIG. 6B is a sectional end view of the timer taken along lines 6B—6B of FIG. 6A;

FIG. 7 is a sectional view taken along the line 7—7 of FIG. 5 showing the construction and operation of a decorating mechanism and its mounting upon the carriage;

FIG. 8 is a perspective view of a plate showing the decoration applied by the decorating head shown in FIG. 7;

FIG. 9 is a sectional view along the line 9—9 of FIG. 5 of a mechanism embodied in the decorating machine for rotating the decorating heads during each cycle of operation to present different surfaces and to minimize wear;

FIG. 10 is a sectional view along the line 10—10 of FIG. 9 illustrating means for vertically elevating and lowering the mechanism shown in FIG. 9;

FIG. 11 is a sectional view along the line 11—11 of FIG. 7 illustrating details of the adjustment mechanism;

FIG. 12 is a sectional view through a reservoir and the pad for applying liquid color to a decorating head;

FIG. 13 is a sectional view through the rotating table and its mounting showing the seats for containers and vacuum connections utilized therein;

FIG. 17 is a sectional view through a decorating mechanism illustrating the application of a backer with a decoration therein being applied to one side of the container and also illustrating the attachment of the mechanism to the carriage of the machine;

FIG. 17A is a sectional view taken along the line 17A—17A of FIG. 17 illustrating the mounting for the applicator arm;

FIG. 18 is a diagrammatic view similar to FIG. 2 illustrating the positions of the various parts of the decorating machine in the preferred embodiment;

FIG. 19 is a side elevational view of a preferred embodiment of the decorating machine;

FIG. 20 is a perspective view illustrating the applicator mechanism with portions of the cup hold down mechanism and portions of the backer feed mechanism;

FIG. 21 is a sectional view through a preferred embodiment of an applicator mechanism along the line 21—21 of FIG. 22;

FIG. 22 is a side elevational view, partly in section, of a decorating mechanism for applying backers with color designs thereon to opposite sides of a container;

FIG. 23 is a top plan of the automatic feed for backers with designs thereon;

FIG. 24 is a sectional view of the automatic feed for backers with a backer feed head held under the stack ready to remove a backer from the bottom of the stack;

FIG. 25 is a sectional view of the automatic feed for backers similar to FIG. 24 with the head in position to deliver a backer to an applicator head;

FIG. 26 is an end view along the line 26—26 of FIG. 25 of the automatic backer feed;

FIG. 27 is a sectional view along the line 27—27 of FIG. 25 illustrating the mechanism for raising the backer receiving head;

FIG. 28 is a detailed sectional view of a preferred embodiment of an applicator head;

FIG. 29 is a view partly in section of another embodiment of applicator head prior to being moved into position to pick up a backer;

FIG. 30 is a view similar to FIG. 29 in which the applicator head is moved into engagement with a backer on the automatic feed head to pick the backer therefrom;

FIG. 31 is a sectional view through the bearing for an applicator arm along the line 31—31 of FIG. 22;

FIG. 32 shows the air jets and vacuum hood for removing the proper part of the backers after the layer of heat release adhesive has melted;

FIG. 33 is a sectional view along the line 33—33 of FIG. 20 illustrating a stop for fixing the position of the applicator arm with respect to the backer feed head;

FIG. 34 is a sectional view along the line 34—34 of FIG. 35 illustrating the construction and operation of an article hold down mechanism;

FIG. 35 is a top plan view of the article hold down mechanism shown in FIG. 34;

FIG. 36 is a sectional view along the line 36—36 of FIG. 36A through a backer showing the layers of adhesive and design layer thereon;

FIG. 36A is a perspective view of a backer;

FIG. 37 shows a cup with a design on the sides thereof;

FIG. 38 shows a dish with a design on the bottom thereof;

FIG. 39 illustrates the application of a design to the bottom of a container utilizing a liquid;

FIG. 40 is a diagrammatic view similar to FIGS. 2 and 18 illustrating the mechanism utilized in applying a decoration or backer on the bottom of a glass article;

FIG. 41 is a side view similar to FIGS. 9 and 19 illustrating the decorating mechanism for applying a backer having a design thereon to the bottom of a glass article;

Figure 3:
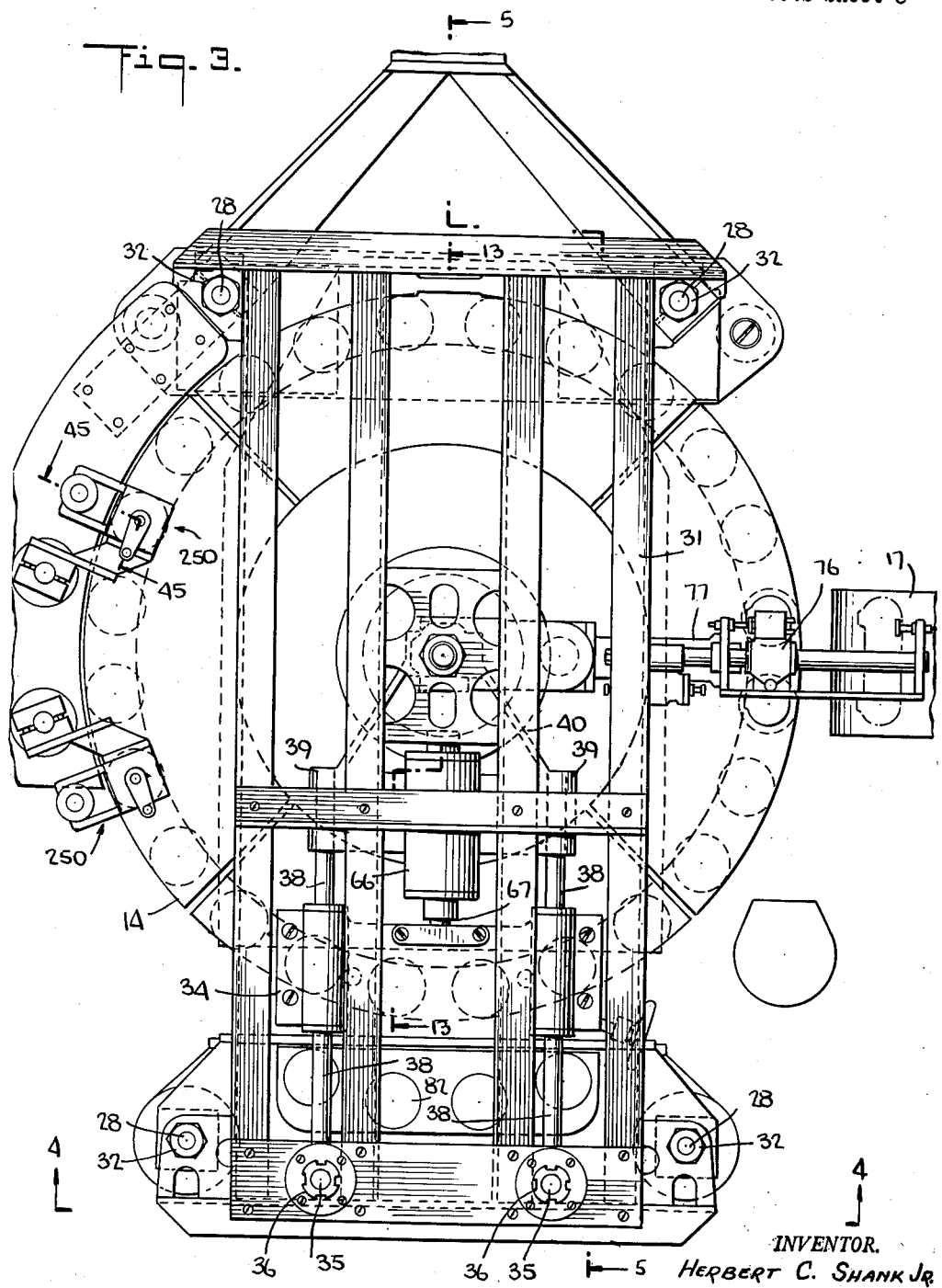
FIG. 3 is a top plan view of the decorating machine.

A preferred embodiment of the invention has been chosen for illustration and description and to illustrate one way of performing the method. The same reference characters illustrate corresponding parts throughout the description. The temperatures given in the specification are on the Fahrenheit scale unless otherwise indicated.

For convenience, the description has been divided into different subjects with headings giving a general indication of each.

THE GLASS LINE

Glass articles are produced in modern plants by automatic machinery in order to obtain low cost by mass production. The present machine is adapted to be a part of such mass production and to fit into the glass line without slowing the production of the other machinery.

Referring particularly to FIG. 1 illustrating a typical glass line embodying the present machine and method, there is shown at the left a glass feeder 1 projecting from a glass furnace, not shown, and delivering molten charges of the glass to the molds of a fabricating machine 2 which shapes the glass by pressing or blowing or by both pressing and blowing into the desired article. The glass article leaves the fabricating machine at a temperature of about 1000° F. and is placed on a conveyor 4 by a suitable transfer mechanism 5. A conveyor 4 carries the ware through the glazer or polishing machine 6 where burners apply flames to the surface of the glass article to firepolish the surface. The ware is transferred from the glazer 6 to a conveyor 7 which normally would lead to an annealing lehr 8 where the glass would be annealed to relieve strains set up in the fabrication thereby to minimize breakage in the use of it.

In the preferred embodiment, the conveyor 7 is extended for a substantial distance along the side of the annealing lehr 8 and passes around a sprocket 9 and over a dead pan, not shown, to be returned through a cooling tunnel 10 for delivery to a preferred embodiment of a decorating machine 11 constructed in accordance with the present invention. The ware is too hot at the time it leaves the glazer 6 to receive a decoration. The desired temperature of the glass when it is transfered to the decorating machine 11 depends on the type of decoration applied, but generally ranges from 275° to 375° F.

The first stages of cooling may be accomplished by exposing the glass articles to air at room temperature as it passes along the conveyor 7. This is desired also to minimize breakage. After the temperature has been reduced the conveyor 7 is passed through the tunnel 10 where air, preferably at room temperature, or suitably cooled is directed against the surface of the ware to increase the rate of cooling and decreasing the time and length of the conveyor required to cool the glass. The application of air in the tunnel 10 may be increased or decreased so that the ware, when it reaches the decorating machine 11, is at the proper temperature for the application of the particular decoration desired. A spacer 20 is provided near the decorating machine to space the articles prior to their reaching the transfer mechanisms.

Referring to FIG. 2 as well as FIG. 1 (FIG. 2 being an enlarged diagrammatic illustration of the decorating machine 11 similar to the small illustration in FIG. 1) it will be noted that the two articles are transferred simultaneously from the conveyor 7 onto the seats or holders 12 of a rotatable table 14 forming a part of the decorating machine 11. The table 14 is rotated intermittently by a suitable Geneva drive 13 (FIG. 13) to move the table step by step two seats at a time. The glass articles are decorated two at a time at station 15 and are then removed two at a time from the decorating machine at station 16 by a suitable transfer mechanism and are deposited onto a conveyor 17 which leads to a turn-table 18 (FIG. 1) which places the containers on a conveyor 19 where a suitable lehr loader (not shown) moves successive rows of glass articles from the conveyor 19 onto the annealing lehr 8.

The lehr 8 fuses the decorations onto the glass articles and anneals the articles to relieve the strain set up during fabrication. The annealed articles are delivered to a so-called inspection table which is at the cold end of the conveyor where they are inspected and placed in suitable cartons for shipping.

Where it is desired to use the glass line without applying decorations, a by-pass may be provided so that articles may move from the glazer 6 directly to the lehr 8. For illustrative purposes, the conveyor 19 leading to the lehr 8 is shown extending over to the conveyor 7. Suitable wires (not shown) may be utilized in the usual manner for directing the ware from conveyor 7 onto the conveyor 19, thus by-passing the decorating machine. With the by-pass at this point, the cooling tunnel would be disconnected. A more direct connection between the glazer and lehr would also be provided, if desired, but since the by-passing is occasional rather than frequent a shorter route is not necessary.

The mechanisms for utilizing the transfer of ware from machines to conveyors and from conveyors to machines depend upon the type of ware and other considerations. For example, a transfer mechanism for a tumbler is generally quite different from that required for a plate. Various transfer mechanisms are known in the industry and shown in patents for these purposes. For these reasons, a detailed description of the particular transfer mechanisms is not necessary or desirable as they would change for different types of ware.

The preferred embodiment of the present invention may be utilized for various types of decoration, three types of which are illustrated herein without intending to limit the invention in this respect.

Figure 14:
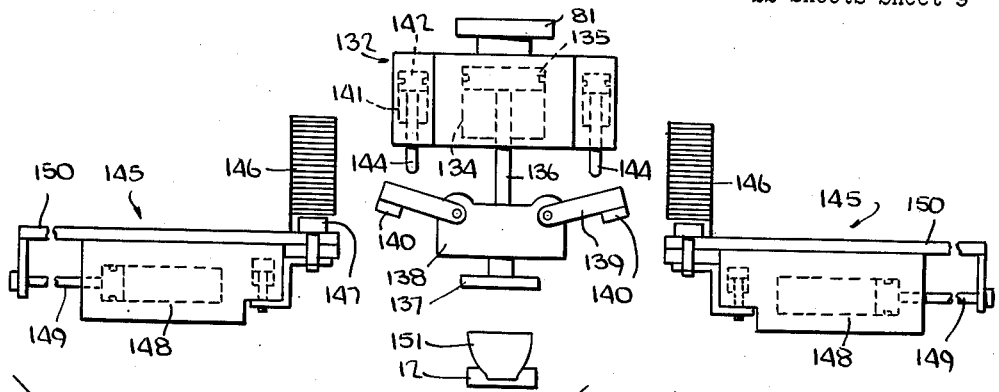
FIG. 14 is a diagrammatic front view showing the first or idle position in the operation of a decorating mechanism for applying a decoration to opposite sides of a container.
Figure 15:
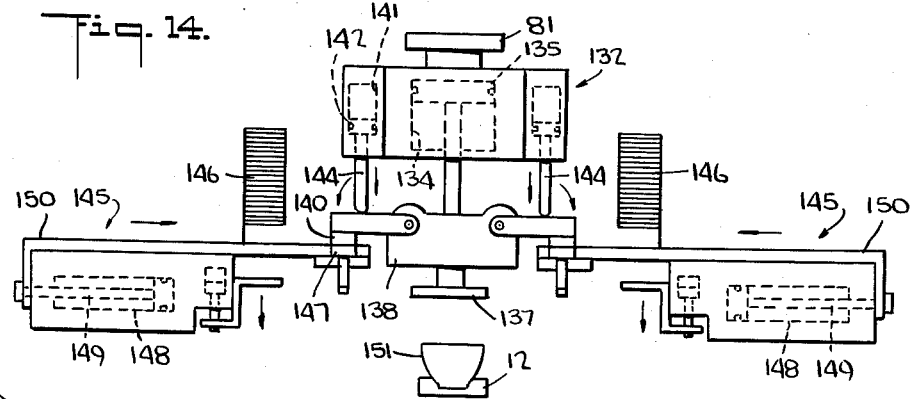
FIG. 15 is a front view of the mechanism shown in FIG. 14 in the position where the applicator heads are about to pick up a backer with a design thereon.
Figure 16:
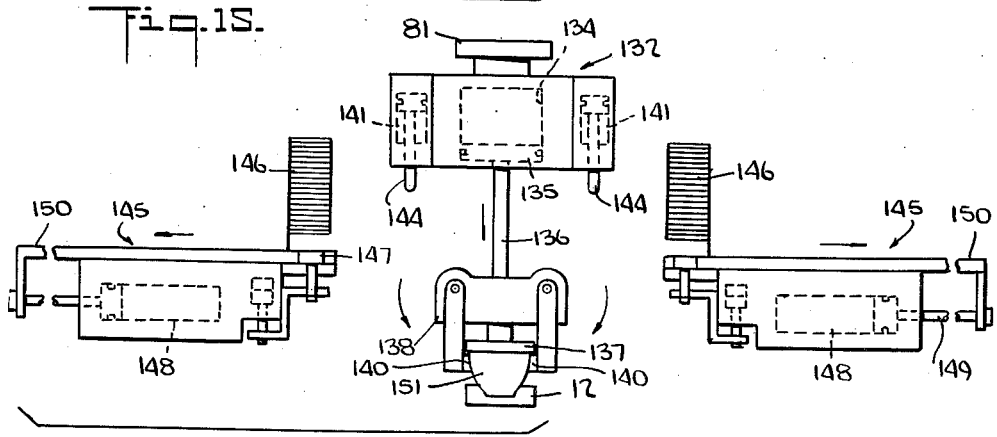
FIG. 16 is a diagrammatic view similar to FIGS. 14 and 15 in a position where the backer is being pressed against the two sides of a container.

In FIG. 8, a plate 21 is shown with a decorative band 22 applied to its rim. In FIGS. 14–16 a decoration is shown applied to the side of a cup. A decoration is shown applied to the bottom of a dish in FIGS. 38 and 42. These decorations may be applied in liquid form or placed on a suitable backing, preferably of paper, and applied to the article and the paper removed leaving the design.

By applying designs on two articles at the same time, the decorating machine can be operated at the speed of the fabricating machine 2 and thus avoid any reduction in the speed of the machines used with it. The decorating machine is located where it can be readily supervised and inspected by one or more operators looking after the lehr, the glazer, and the fabricating machine.

In addition, the decorating machine utilizes the residual heat in the glass in the decorating operation and permits the glass to be delivered to the lehr 8 with substantial residual heat, thus minimizing the amount of fuel used for the annealing and fusing operation. The fusing and annealing are performed in the same lehr, further reducing the amount of fuel required and simplifying and expediting the manufacture.

A further advantage is achieved by reason of the fact that the decoration is applied before the glass has an opportunity to "weather." When contaminated air, vapor, etc., contacts glass, there is a conversion of alkali on the surface of the glass to sodium carbonate and free silicate. The application of the coating in a very short time after the fabrication minimizes this conversion and makes the applied decoration more resistant to detergents, which is an important factor because glass articles are washed repeatedly during use in various types of detergents.

BASIC MACHINE

A decorating machine in a glass line should be adjustable to decorate various types of ware and for various types of decoration as the fabricating machine is changed from time to time to produce different types of ware and customers from time to time require different types of decorations on the ware.

The preferred embodiment achieves this by having a basic machine which may be used for various types and shapes of ware with attachments which may be applied to the machine for different types of decorations. The basic machine is shown more particularly in FIGS. 2 to 6 set up to apply bands to the rims of plates. The permanent parts of the machine will now be described.

Figure 4:
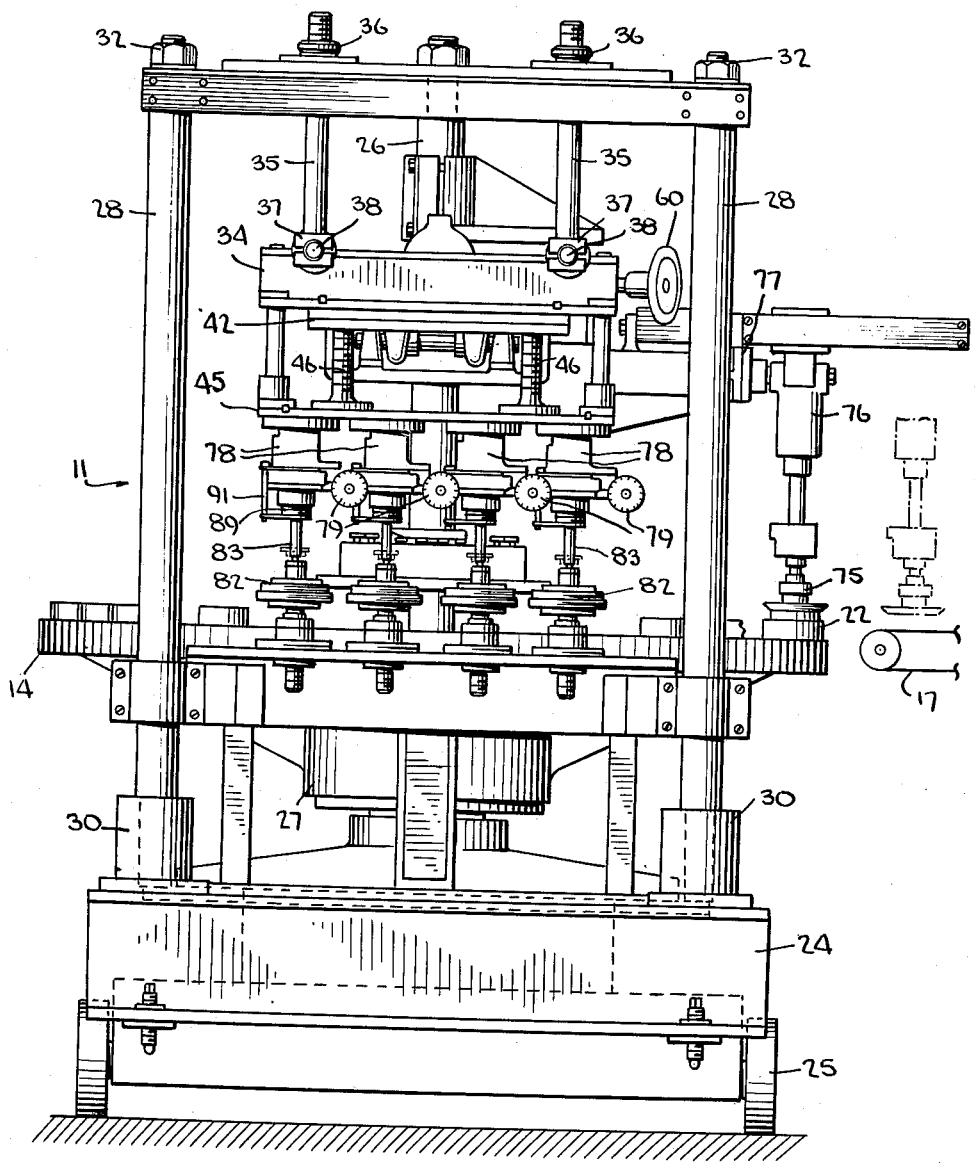
FIG. 4 is a front elevational view of the decorating machine.

Referring more particularly to FIG. 4, the decorating machine 11 is shown having a base 24 mounted on wheels 25. A central shaft or column 26 (FIGS. 5 and 13) extends vertically from the center of the base through the rotatable table 14 which is mounted on a bearing 27 (FIG. 13). Four vertical columns 28 (FIG. 5) are mounted by suitable brackets 30 to cooperate with the central column 26 in supporting a horizontal framework 31 connected to the upper ends of the four columns 28 and the central column 26 by nuts 32 holding the framework 31 against suitable shoulders on these columns. The frame 31 not only serves to reinforce the several columns 28 to which it is attached and to hold them in position but also serves as a support for a reciprocating carriage 34 which in turn supports the decorating mechanisms for different types of articles.

Referring more particularly to FIGS. 3, 4 and 5, there is shown a pair of vertical rods 35 bolted at their upper ends to the horizontal frame 31 as shown at 36. The lower ends of the rods 35 have bearings 37 holding a pair of horizontal rods 38. The opposite ends of the horizontal rods 38 are mounted in two bearings 39 forming a part of a triangular bracket 40 secured to the central column 26 by a bolted sleeve 41 fitting about the central column. The rods 38 mounted in a horizontal position, as described above, serve to slidably mount the reciprocating carriage 34.

The construction of the carriage 34 is shown more particularly in FIG. 6 where the horizontal rods 38 are shown slidably supporting it. The carriage comprises an upper frame 42 bolted to the members 44 slidably mounted on the rods 38. The carriage 34 has a lower plate 45 supported by the vertical threaded rods 46 secured thereto at their lower ends by bolts 47. These threaded rods 46 are threaded into sleeves 48 mounted in ball bearings held in position by plates 49 and 50 forming a part of the upper frame 42 of the carriage. The plate 50 is secured to the plate 49 by bolts 51.

For the purpose of adjusting the lower plate vertically, the threaded vertical rods 46 are mounted in threaded sleeves 48 having gear teeth 52 about their periphery to form a gear. Vertical adjustment of the lower plate 45 and the threaded vertical rods 46 is achieved through the intermediation of the gear 52 meshing with a gear 54 which in turn meshes with a gear 55 on shaft 56 having a beveled gear 57 on its upper end meshing with an upper bevel gear 58 on shaft 59. The gears 52, 54 and 55 are held in suitable bearings in the plates 49 and 50. Corresponding gears connect with the additional threaded vertical rod 46 at the right of FIG. 6. The shaft 59 has a hand-wheel 60 at one end so that rotation of the hand-wheel 60 turns the shaft 59 for vertical adjustment of the lower plate of the carriage and any mechanisms mounted thereon.

A motor 61 is also connected to the shaft 59. Thus, the carriage may be adjusted vertically either by the hand-wheel 60 or by the motor 61 through the intermediation of beveled gears 64 and 65 and the chain of gears cooperating with gears 52 which support the threaded vertical rods 46, as described above. The carriage reciprocates back and forth horizontally on the rods 38 by means of an air cylinder 66 (FIG. 3) having a piston rod 67 connected to the carriage.

It will be noted that the lower plate 45 (FIG. 6) may be raised and lowered either by the motor 61 or the hand-wheel 60 operatively connected to shaft 59 which in turn is connected through a train of gears to the gears 52 supporting the threaded vertical rods 46. This permits easy and quick vertical adjustment of any decorating mechanism operatively connected to and supported by the lower plate 45.

It will also be noted that the air cylinder 66 reciprocates the carriage horizontally to shift the decorating mechanisms mounted thereon from a position over the path of the seats or holders 12 to a position offset with respect thereto as shown more particularly in FIG. 5. Thus, the decorating mechanism may apply a decoration and be moved laterally to receive the decoration for the next application.

It will be noted later, as shown in FIG. 5, that the coloring mechanisms are operated in a vertical direction by air cylinders 68 (FIG. 5) so that the color applicator may and is usually given an upward movement from the ware, a lateral movement away from the path of the ware, and a downward movement to obtain a supply of color or other decoration as shown by the arrows. The procedure is then reversed by raising it from the color mechanism, moving it back over the path of the seats 12 and then down onto the ware. This is achieved by the horizontal reciprocation of the carriage 34 operated by the air cylinder 66 and by the air cylinders 68 giving vertical movement to the color applicators.

The compressed air for the various air cylinders is controlled by a timer 70 (FIG. 2) which supplies air to the respective ends of the cylinder and opens the end to the atmosphere for reciprocating a piston within the cylinder. Such timers for controlled air cylinders are well known in the glass industry and a description is not necessary. One such suitable timer may be found on the so-called Miller Lynch MP machine well known in the trade.

For convenience, a timer of the type referred to above, which may be used with the present invention, is shown in FIGS. 6A and 6B. A rotatable drum 300 having a series of cams 301 operate air valves 302 connected to the various air cylinders by means of conduits 303. The air valves operate by needles 304 which are engaged by pawls 305 when the drum 300 is rotated. The drum is rotated by drive shaft 306 operatively connected and timed with the drive for the machine. The cam 301 strikes the pawl 305 to lift the valve needle 304 to supply air to the conduits 303. Thus, any number of air cylinders may be operated simultaneously or in any desired sequence by connecting each air cylinder to proper valves on the timer and by adjusting the cams which open those valves.

In many cases, it is desirable that the article be held on the seats 12. For this purpose, the respective seats 12 are connected by conduits 71 (FIG. 5 and FIG. 13) and a distributor 72 to a suitable source of vacuum whereby the articles are held in securely in position by the application of vacuum, which is, of course, relieved prior to the station where the articles are removed. The distributor 72 is mounted about the central column 26.

As illustrative of one type of take out mechanism shown utilized for transferring plates from the decorating machine to the conveyor 17 there is shown in FIG. 4 a vacuum holder 75 raised and lowered by an air cylinder 76 and reciprocated horizontally by an air cylinder 77. In this way, a plate may be raised from the seats 12 by the air cylinder 76 and holder 75 moved laterally to place them on the conveyor 17. The holder 75 is then returned to pick up another piece of ware by a reverse cycle of these operations. As indicated previously, the vacuum holder 75 would be in duplicate to pick up two pieces of ware at the same time.

A convenient way of transferring plates from a conveyor to the holders 12 has been the utilization of a pair of pushers which engage the plates on the conveyor and pushes them onto the holders 12 with suitable supporting parts, such as dead plates, extending between the conveyor and the holder.

As indicated above, the basic decorating machine, as thus described, is the same for all types of ware and for all types of decorations. Illustrative mechanisms secured to the carriage 34 for applying several decorations will now be described.

RIM DECORATION

A mechanism for decorating the rims of glass articles is adapted to be mounted on the carriage 34, as shown more particularly in FIGS. 4 to 6. In this particular embodiment, a gold band 22 is applied to the rim of a plate 21, as shown in FIG. 8. The plate is preferably made of borosilicate glass to withstand the additional thermal shock occasioned by the increase in temperature required in the annealing lehr to obtain proper fusing of the decoration to the glass. Excellent results have been obtained by a gold color solution purchased from Eberhardt Industries, Inc., Newark, New Jersey. This solution gives a gold color which is fused to the glass so as to withstand various types of detergents in successive washings.

To obtain the best results, the ware should be delivered to the decorating machine directly after leaving the fabricating machine and as soon as the temperature has been reduced to between 325° to 375°, preferably 350°. This will avoid weathering and produce a better bond between the design and the glass. Preferably, the applicator head shown more particularly in FIG. 7 has a ring 73 of polyethylene sponge or a similar material for taking on the color which is applied, to the rim of the container. This material will permit the rim of the dish to imbed itself into the sponge ring 73 so that the rim is enveloped and a relatively wider band applied to the inside as shown in FIG. 7. The height of the head with respect to the carriage when in its lower position should be carefully adjusted to compensate for wear. Polyethylene scars when subjected to temperatures above 400° F. and hence, it is desirable to have the ware below that temperature at the time of application.

After the ware leaves the machine, it should be raised to a temperature of about 900° F. in the front end of the lehr 8 for a period of about four minutes to evaporate solvents. Thereafter, the temperature should be raised to about 1300° F. for fixing the color on the glass. The temperature is then lowered to an annealing temperature of from 1000° to 1100° F. for the usual annealing period and cooled in stages as is customary in annealing.

Referring more particularly to FIG. 4, a front view of the decorating machine is shown. It will be noted that four decorating mechanisms 78 are shown attached to the lower plate 45 of the carriage 34. The locations of these decorating mechanisms are arranged in an arcuate path so that they will register with four seats 12 on the table 14. Each of the decorating mechanisms 78 has a vertical or a height adjustment operated by individual hand wheels 79. A detailed view of the carriage is shown at FIG. 6 together with fragmentary upper ends of the decorating mechanism 78 secured to the lower plate 45 of the carriage.

A detailed view of one of the color mechanisms 78 is given in FIG. 7. The mechanism is secured to the lower plate 45 of the carriage 34 by means of flange members 80 bolted to the plate 45 to engage a disc 81 bolted to the upper head end of the color mechanism.

A color applicator 82 is secured to the lower end of a piston rod 83 for engaging and applying color to the rim of a glass article. The details of the color applicator 82 are shown in FIG. 12 and will be described later. The piston rod 83 is secured to a piston 84 adapted to reciprocate in the air cylinder 85. Compressed air conduit 86 connects with the upper end of the cylinder 85 and compressed air conduit 87 connects with the lower end of the cylinder 85 so that the piston 84 may be raised and lowered by air pulses responsive to the setting of the timer with respect to this cylinder.

The downward movement of the piston rod 83 is limited by the annular member 88, which engages the lower end of the threaded cup member 89. The threaded cup member 89 is prevented from rotation by the plate 90, bolted to its lower end, which is engaged by a pin 91 depending from plate 92, rigidly held in position. The threaded portion of the cup member 89 engages the internal threads on the cylindrical member 94, which is free to rotate about the member 95 and being secured in place by a collar 96.

The threaded connection between the cup-shaped member 89 and the cylindrical member 94 is to permit minute adjustments of the lower limit of the stroke of the color applicator 82 to obtain best results in the color application. This is done by rotating the cylindrical member 94 through the intermediation of gear 97 bolted thereto, meshing with a gear 98 on shaft 99, which in turn (FIG. 11) has a gear 100 meshing with gear 101 on shaft 102, carrying at one end the hand wheel 79. In this way, the lower position of the color applicator 82 and the amount of pressure applied to the rim of the container may be accurately adjusted. The amount of pressure applied to the rim of the container is not critical but the spongy material used for retaining the decorating material tends to wear and adjustments are desirable to compensate for that wear.

As pointed out previously herein, color applications are made simultaneously to two articles of ware in order to have the speed of the decorating machine equal to or greater than the speed of other machines in line. As shown herein, four mechanisms 78 (FIG. 4) are attached to the lower plate 45 of the carriage. The first and second of these from the left apply color to the rim of the container. The third and fourth color heads are the same as the color applicators 82 but are not used to deposit the color to the rims. However, these additional heads, i.e., the third and fourth in the group, engage the wet rims of the articles after the color has been applied, to spread the color on the rims and to enhance the uniformity and intensity of the color.

Referring more particularly to FIG. 5, the movement of the color applicator 82 is shown by the arrows 69. The cylinder 68 raises and lowers the color applicator and the air cylinder 66 reciprocates the carriage 34. By the operation of these two cylinders, the carriage is moved to the right of FIG. 5 in position for application of color, whereupon the four cylinders 68 lower the heads to apply and spread the colors on the rim of the article. The four cylinders 68 then raise the heads to their upper position whereupon the carriage is moved by cylinder 66 to the left so that the color heads 12 register with a pad 104 for supplying color to the applicator. This cycle continues whereby the applicator heads in one lateral position are lowered to apply the color to two articles and to spread the color on two others and in the opposite position two of the heads lowered to pick up additional color for application in the next cycle.

While any suitable means may be utilized for applying color to the color heads 82, a preferred embodiment is illustrated in FIG. 12. A conduit 105 connected with a source of color supplies it to a reservoir 106 which is covered by a disc 107. The reservoir 106 is connected by conduits 108 to an annular portion 109 which has an annular screen or perforated plate 110, carrying a ring of sponge-like material 111. Any suitable material may be used which is spongy. For example, excellent results have been obtained with a polyethylene sponge having a density of about 2.2.

In order to further improve the results of the color application, the color applicators 82 and also the spreaders are rotated slightly during each cycle. For this purpose, there is provided on each of the piston rods 83 (FIG. 7) a gear 112 which is engaged by a ratchet 114. The mechanism for this operation is shown in detail in FIG. 9. Four ratchet members 114 are mounted to engage respectively each of the four gears or ratchets 112 on the piston rods 83. The ratchet members 114 are secured to the outer ends of arms 115 which are secured to a cross member 116 mounted on brackets 117 (see FIG. 10) which in turn are secured to a bracket 118 bolted to a sleeve 119 threadedly mounted on a threaded shaft 120. A bevel gear 121 on the end of shaft 120 meshes with a bevel gear 122 on shaft 124. A crank 125 with a spring-pressed detent 126, which keeps it in any set position, may be utilized to raise and lower the mechanism.

By the use of the vertically adjusted supporting mechanism shown in FIG. 9 for the ratchet members 114, it is feasible to vertically adjust the ratchet members quickly to correspond with the vertical adjustments of the carriage 34, which may be required for different heights of ware. Otherwise adjustments of the carriage and the gears 112 would prevent the registering of the ratchets 114 with the gears.

SIDE DECORATION

A preferred embodiment of a mechanism for applying decorations to the sides of a glass article or container has been chosen for illustration and description and is shown in FIGS. 14 to 37. In this embodiment, the color is applied to a backer before application to the container and the mechanism picks up the backer and presses it on to the sides of the container or glass article.

*Backer*

Before describing the mechanism, a short description will be given of the backer which is shown in detail in FIGS. 36 and 36A. In the sectional view shown in FIG. 36, there is illustrated a sheet member 127, preferably made of a high quality kraft paper, which is reasonably stable dimensionally—the greater stability the better. A layer of a color or design 128 is secured to one side of the paper by a heat-resealing layer of adhesive 129. The design 128 is preferably a ceramic design comprised of powdered glass so as to fuse with glass of the ware being decorated. On the opposite side of the design layer 128, that is the side remote from the paper, a surface of heat effective adhesive 130 is applied. As indicated elsewhere herein, the glass is presented to the decorating machine at a temperature of about 300° F. When the adhesive surface 130 of the backer 131 is pressed against the hot glass, the adhesive layer 130 bonds the color or design layer 128 to the glass. At the same time, the heat of the glass penetrates through the adhesive and design layers to the heat-releasing layer 129, causing it to release the paper sheet 127. If the temperature of the glass is too high, there is a tendency for slippage, which causes smearing of the color. If the temperature is too low, the heat-released layer does not melt and release the paper carrier 127. While the operating temperatures of the glass will depend to some extent on the two layers of adhesive 129 and 130, excellent results have been obtained with a temperature of 300° F., plus or minus 10°, with backers manufactured by Myercord Company of Chicago, Illinois. In annealing and fusing, the temperature of the ware should be raised about 200° F. above the usual annealing temperature to obtain the best results in fusing a design on the article.

The humidity is an important factor in connection with the backers 131. Excellent results have been obtained by making the backers in a room at a temperature of 70° with a humidity of 50% and in storing them in a room of the same temperature and humidity. Preferably, the backers are shipped in boxes which are wrapped to maintain this condition until they are used. If during storage or manufacture, the backers lose moisture or gain moisture, the moisture content should be restored by storage in a room with a humidty of 50% and a temperature of 70°.

*Diagrammatic Illustration*

Referring now to the mechanism for applying the backers 131 to glass articles, a diagrammatic illustration of the operation is shown in FIGS. 14, 15 and 16. The applicator mechanism 132 has the disc 81 which is secured to the lower plate 45 of the carriage 34 of the basic machine described hereinabove (see FIGS. 6 and 7).

Two units are utilized so that backers are applied to two containers simultaneously at spaced stations.

In the diagrammatic showing, the mechanism 132 has a main air cylinder 134 with a piston 135 on a piston rod 136, which has an article holder 137 at its lower end and an applicator unit 138 carrying a pair of applicator arms 139 having applicator heads 140. An air cylinder 141, mounted on each side of the main air cylinder 134, has a piston 142 on a piston rod 144 directly above the applicator arms when they are in their upper position.

At each side of the applicator mechanism 132, an automatic feed 145 is provided for feeding backers from the bottom of the stack 146 and presenting them to the applicator heads 140. The details of this backer feed 145 are shown more particularly in FIGS. 23 to 27. A backer is pulled from the bottom of the stack by a vacuum head 147 and moved by the air cylinder 148 through the piston rod 149 and slide 150 until it is positioned beneath the picker heads 140.

The first step in the operation is shown in FIG. 15 wherein the automatic backer feed 145 through the vacuum head 147 has pulled a backer from the stack 146 and presented it beneath the applicator head 140 on the applicator arm 139, whereupon air is admitted to the upper end of the air cylinder 141 to move the piston 142 and its piston rod 144 down to cause the applicator head 140 to pick the backer up by vacuum. The piston 142 is then raised and the vacuum head 147 returned to position under the stack. At this point, compressed air is supplied by the timer on the machine to force the piston 135 down until the article holder 137 engages the rim of the container. Further pressure causes a relative movement between the applicator unit 138 and the rod 136 whereupon racks and gears, not shown, swing the arms 139 downwardly to press the backer firmly against opposite sides of the container, as shown more particularly in FIG. 16. Compressed air is then supplied to the lower end of the cylinder 134 to raise the article holder 137 and the applicator unit 138 to bring them back to the position shown in FIG. 14. In this way, backers having color designs applied thereto are removed from the bottoms of a pair of stacks, fed to applicator heads, and applied to the opposite sides of a glass container, such as a cup, 151, resting on a seat 12 on the intermittently rotatable table 14.

*Decorating One Side*

As indicated above, the illustrations in FIGS. 14, 15 and 16 are in a large measure diagrammatic to illustrate the operation with respect to preferred embodiments. Referring more particularly to FIG. 17 illustrating the details of an applicator unit 132', it will be noted that the upper end is secured to the lower plate 45 of the carriage on the basic machine by flange members 80 engaging under the disc 81, an air cylinder 134 having a piston 135 on a piston rod 136 which carries an article holder down 137.

In the mechanism, a single applicator arm is shown for applying a single backer to one side of the container 151.

The applicator arm 139 is fixed to a shaft 152 carrying a gear 154 meshing with a rack 155 thereby forming a rack and pinion for swinging the applicator arm 139 from an upper position, shown in dotted lines, to a lower position where it presses a backer against the side of the container 151. In operation, air furnished through conduit 86', forces the piston 135 downwardly until the article holder 137 engages the top of the container 151 to hold it firmly on its seat 12. Further movement of the piston 136 causes a relative movement between the piston rod 136, through the intermediation of coil spring 156, which is free to slide within the piston 135 and the support 158. This relative movement forces the rack 155 downwardly to rotate the gear 154 which swings the arms 139 against the side of the container applying a backer thereto.

A stop bar 159 is utilized to hold the parts in the backer pick-up position as shown in dot-dash lines when carriage 134 moves the mechanism to its opposite position for picking up a backer. While the stop 159 is not essential it is helpful in improving the operation.

The mechanism for applying a backer, shown more particularly in FIGS. 23 to 27 is not shown in this drawing. The backer applicator arms 139 are pushed down as previously described with respect to FIGS. 14 to 16, by an air cylinder 141 effective upon a piston 142, having a piston rod 144 for engaging and pressing down picker arm 139. Air is furnished to the upper and lower ends of the cylinder 141 responsive to the timer operation. A member 160 on the upper end of the piston rod 136 slides in a key way 161 to prevent rotation of the article holder 137 and its associated mechanism.

Referring to FIG. 17A which is a section along the lines 17A—17A of FIG. 17 through the pinion which supports and operates the applicator arms 139, it will be noted that a conduit 152 passes through the center of the shaft 153 carrying the gear 154 which meshes with the rack 155. The conduit 152 leads through the applicator arm 139 to the head 140. The shaft 153 is mounted in a ball bearing 164.

The mechanism shown in FIGS. 17 and 17A described above illustrate the application of a single design on one side only of an article such as a cup. It will be understood that a similar applicator mechanism could be mounted on the opposite side to apply a decoration to the other side of the cup. The construction of the mechanism in FIGS. 17 and 17A conforms generally to the diagrammatic illustration shown in FIGS. 14, 15 and 16 except that a single design is applied in FIG. 17 and two designs are applied in FIGS. 14 to 16.

*Decorating Two Sides*

The preferred embodiment of applicator mechanism for applying designs to opposite sides of an article such as a cup is shown more particularly in FIGS. 18 to 22 with the automatic feed for the backings shown in FIGS. 23 to 27 and with the details of the applicator arms and head shown in FIGS. 28 to 30 and with the holder for engaging the top of the cup shown in FIGS. 34 and 35.

This embodiment will now be described. Referring more particularly to FIG. 18 which corresponds to the diagrammatic showing in FIG. 2 with the additional mechanism added to show the positions on the machine.

As described with respect to FIG. 2 the container 151 is brought to the decorating machine by the conveyor 7 and transferred onto the seats 12 two at a time where the table 14 rotates the seats step by step so that the design may be applied to two containers at a time. The position of the carriage 34 is shown and the air cylinder 66' for reciprocating it. It will be noted that four seats 12 are always in position to be stationed under the carriage 34. The applicator mechanisms for applying the designs are not shown but their locations may be determined by the position of the backer feeds 145'. It will be noted that two of these at the left serve the applicator for the container at the left and the other two backer feeds serve the applicator for the container at the right side of the carriage. The two containers in the middle of the carriage are not being operated upon, the spacing being desirable to accommodate other parts and to give room for the operation of two applicator mechanisms simultaneously. If adjoining containers were selected there would be insufficient space between them, hence the container at the right has a design applied to it by the first applicator mechanism and the container at the left center has no design applied to it but will be placed under the applicator at the right of the carriage in the next movement of two stations forward by the table 14.

A stop 165 is provided for use in connection with each of the applicators and serves to limit the lower position of the applicator arms when they are picking up a backer, these will be described in more detail later.

As the decorated containers leave the second station two pairs of air jets 166 are applied at the next station to two cups at a time. On the opposite side of the cups a vacuum hood 167 is provided. As previously described, the paper forming the backer for the color design is adhered to the color design by a heat release adhesive. Hence when the heat of the glass becomes effective upon the heat release adhesive the paper backer becomes loose and the air jets 166 blow it into the vacuum hood 167, in this way the paper backers are removed from the containers leaving the design adhered thereto. When the two decorated containers reach the station opposite the end of the conveyor 17 they are automatically transferred to the conveyor as shown in dash lines at 168.

The position of the parts in side view is shown in FIG. 19. The horizontal rods 38 described in connection with the basic machine permit reciprocation of a carriage 34' by an air cylinder 66' having its piston rod connected to it. The applicator 45' is connected to the lower support 47' for supporting the applicator. The cup 151 is shown in position to receive a decoration. It will be noted that the cup is held on its seat 12 by a cup holder 169, which will be described later, mounted on a bracket 170 attached to the lower portion of the cylinder 66'.

At the left of the applicator (FIG. 19) there is shown a backer feed 145 which is substantially the same as that illustrated in FIGS. 14, 15 and 16 and which is described in detail later. In operation the carriage 34', in the position shown in FIG. 19, supports the applicator mechanism over a station for application of a design to a cup. The next step in the cycle is for the air cylinder 134' to operate through rack 155' to swing the applicator arms 139' to apply the backer design to the container; thereafter the air cylinder 134' raises the applicator arms 139' to disengage the container 151 whereupon the carriage 34' moves to the left of FIG. 19 to register the heads on the applicator arms 139' with a backer presented by the backer feed 145. The air cylinder 134' moves the arms down to pick up a label as will be described later.

In FIG. 20 the decorating mechanism is shown in perspective during the cycle when the head 140' on the applicator arms 139' is about to pick up a backer from the backer feeder 145 which is only partially shown. The cup hold down 169 is also shown at the left of FIG. 20. The mechanism for applying the decoration to two sides of the cups is shown more particularly in FIGS. 21 and 22 and will now be described.

In FIG. 21 it will be noted that the applicator mechanism has a disc 81 bolted to its upper end and secured to the lower plate 45 of the carriage by flange members 80 which support it in position on the carriage.

For the operation of the applicator arms, both for applying backers to opposite sides of a container and for picking up backers from the automatic feed, an air cylinder 134' is provided having a piston 135. Compressed air enters the upper end of the cylinder through conduit 86' (FIG. 22) to move the piston downwardly. The rack 155' is secured to the piston rod and meshes with the gear or pinion 154' to rotate the shafts 153' in bearing 164' carrying the applicator arm 139'. In this embodiment there are two arms 139' attached to the applicator heads 140' by means of the screws or bolts 171. One of the applicator arms 139' shown on the right in FIG. 21 has a conduit 152' leading upwardly to the shaft 153' and continues through the shaft for connecting to a source of vacuum. The bearing 164' is secured to a member 172 by a sleeve 174. The member 172 is bolted to plate 173, which in turn is bolted to the lower end of the cylinder 134' to close it. The lower end of the rack 155 has a lateral extension 175 (FIG. 20) which serves to engage the adjustable stops 173A limiting the upward movement of the rack at the time the applicator head 140' picks up a backer as shown in FIG. 20.

The extension 175 on the end of the rack moves between two vertical bars 176 secured at their upper ends to the plate 173 by means of screws 177 and carrying at their lower ends a cross member 178 secured to them by screws 179. A vertical rod 176' serves as a guide for the bracket.

The preferred embodiment of the picker head, which is shown in FIG. 28, will now be described. The portion of the head engaging the side wall of the container should be shaped to conform to the curvature or contour of the side wall and should have a rubber surface 180 for applying resilient pressure to the backers. However, the curved surface does not serve well in picking up a backer from the automatic backer feed. The central portion of the head is therefore preferably provided with a pin 181 slibably mounted in a cylindrical bore in a member 182, the upper and lower limits of the movement being determined by the enlarged end 184 engaging the shoulder 185.

A spring 186 tends to hold the pin in its outer position so that it projects outwardly as shown in another embodiment in FIG. 29. When there is no backer on the head, the duct 187 in the pin 181 is opened hence the application of a vacuum has no effect, but when the end of the pin 181 engages a backer the duct 187 is closed hence a vacuum through the conduit 152' not only holds the backer in place on the pin 181 but pulls the pin back into its retracted position in opposition to spring 186 as shown in FIG. 28. However, when the backer is moved from the end of the pin the spring 186 forces it into its outer position ready to pick up another backer. For best results the opening in the pin should be about one-eighth to three-sixteenths inch in diameter. If the hole is too big the backer puckers and if too small the pin does not pick up the backer.

The operation of the applicator head in picking up a backer is shown in FIGS. 29 and 30. The pin 181' is shown in its extended position under the force applied by the spring 186. Mounted below the applicator head in FIG. 29 is a backer 131 shown being presented by the automatic backer feed head 188. Referring to FIG. 30 the applicator head is moved downwardly until it engages a backer whereupon the vacuum draws the pin 181' in opposition to the spring 186 to its retracted position assisted in part by the feeder head 131.

The head in FIGS. 29 and 30 differs to some extent from that shown in FIG. 28 in that the facing 180' is adhered to the end of the pin only where as in FIG. 28 the facing is in two parts with a portion bonded to the end of the pin 181 and a second portion apertured and bonded to the head to let the pin pass through it.

Article Hold Down

It will be noted that in the applicator described in the preceding embodiment, the mechanism which has been described in detail so far does not have an article holder operating as a part of the operation of the application arms. In the preferred embodiment a separate mechanism for holding two articles down on their seats is provided and will now be described.

Referring more particularly to FIGS. 19, 20, 34 and 35 there is shown, in section in FIG. 34, an air cylinder 190 having its end closed by a disc 191 with bracket members 192 adapted to receive and be bolted to the end of a bar 178' which may in turn be secured by bolts 207 to bracket 170 shown in FIG. 19.

A piston 194 has a piston rod 195 connected to the middle of a bar 196. One end of the bar has a pin 197 slidably mounted in bearing 198 in a bracket 199 formed on the lower end of the cylinder 190. The other end of the bar 196 has an article holder or head 137' secured thereto by a holding member 200. The disc like head 137' has a shoulder 202 for seating an annular ring 204 of rubber or the like of the same size as the rim of the container so it may engage the rim of the container to hold it down without breaking it. The head is made in two parts for convenience in manufacture.

The cylinder 190 has an air conduit 205 connected to its upper end and a second air conduit 206 connected to its lower end for raising and lowering the piston. When the piston is lowered the article holder or head 137' engages the rim of the cup and holds it securely in position.

The operation of the hold down mechanism will be clear from the above description. The air cylinder 190 is stationarily mounted, as will be seen more particularly in FIG. 35 and two article engaging discs 137' are provided at each end of the bar 178". The bar 178" is bolted by means of the bolts 207 to the lower edge of the bracket 170 shown in FIG. 19. Thus the two air cylinders 190, one for each unit, operate separate holding down members to engage the rims of two containers and holding them down on their seats 12 while designs are simultaneously pressed on opposite sides thereof. It will be understood that the same hold down mechanism could be used for applying a single design to one side of a container.

*Backer Feed*

The automatic feed for backers is shown in detail in FIGS. 23 to 27. The operation of the feeder is shown diagrammatically in FIGS. 14 to 16 which have been previously described. In these figures, it will be noted that an automatic backer feeder is provided on each side of the decorating mechanism and that an arm carries a head, which is normally under a stack of backers, from which it removes the lowest backer. When the backer is to be fed to the decorating mechanism, the arm is moved toward the decorating mechanism until it is under a picker head. The picker head is pressed down to remove the backer on the feeder head. The preferred embodiment of the automatic feeder is the same in all cases and, hence, the same reference characters are used.

Referring more particularly to FIGS. 23 to 25 there is shown a stack 146 for holding the backers and a head 147 for removing the backers from the stack. The head is mounted on a slide member 150 secured by a bracket 209 on its end to a piston rod 149 attached to a piston 210 in the air conduit 148. The air cylinder 148 is mounted on a stationary base 211. Compressed air is supplied to the two ends of the piston 148 through conduits 212 and 214 shown in dotted lines in FIG. 25. When air is supplied to the left side of the cylinder the slide 150 is moved to the right as shown in FIG. 24 to position the head 147 under the stack 146. When air is delivered to the other side of the cylinder 148 the head 147 is moved to the left as shown in FIG. 25 so that a backer may be removed from it; in other words the head 147 will be directly under a head 140 on a picker arm 139.

The head 147 has a series of openings or perforations 214 and a conduit 215 formed under these openings connected with a vacuum conduit 216. The vacuum head will pull a backer from the bottom of a stack and hold it on the head until it is pulled off by the picker. The openings 217 and 218 are plugged for the purpose of facilitating the operations necessary to form the conduits within the head.

It will be noted that the vacuum head is vertically movable since its lower stem 219 is slidably mounted in a bracket 220. When the head is moved to the right and stops under the stack 146 the lower end of the stem 219 has a groove 222 which is engaged by a member 221 having a U-shaped slot fitting in the groove 222. The member 221 is bolted to an L-shaped member 224 connected at its lower lateral portion with the end of the piston rod 225 on piston 226. When the head is under the stack air is supplied to the lower end of the piston from a conduit not shown to raise the piston and the L-shaped member 224 to raise the head 147 into contact with the bottom backer in the stack.

The stack is supported at its four corners by member 227 and may also be supported along its edges if desired. As the head 147 is raised into engagement with the bottom of the stack vacuum is applied through the conduit 216 to hold the lower backer. The head is then lowered by supplying compressed air through a conduit not shown to the upper end of the air cylinder thereby lowering the piston 226 pulling the lowermost backer out of the stack.

Thus in response to air pulses from the timer 70 on the machine the head and slide 150 are reciprocated to positions where the head is under the stack 146 and is raised by the vacuum cylinder to engage a backer and then to lower it to pull the backer from the bottom of the stack. Thereafter the cylinder 148 moves the head 147 to the left to position it under the head 140 on an applicator arm 139 so that the backer may be removed. The holder for stack 146 is mounted on a bracket 228 secured to the air cylinder 148.

BOTTOM DECORATION

Many glass articles have a decoration on the bottom, for example, a dish such as shown in FIG. 39 or plates and other articles. A preferred embodiment of a decorating mechanism for applying decorations to the bottom of glass articles is shown in FIGS. 40 to 44 and will now be described.

For convenience, the general operations of the machine are shown in a top plan diagrammatic view in FIG. 40.

The table 14 presents glass articles under the carriage which is reciprocated by an air cylinder 66'. In the first embodiment a backer is applied to the two containers at the left of the center. Pressure applicators 229 may be utilized to apply pressure to the backers in a second step on the two glass articles at the right of the center. As previously described with respect to the decorations on cups, air jets 166, two at each of the two stations, blow the loosened backers from the bottom of the articles and the vacuum hood 167 draws them away from the machine. The glass articles are removed automatically two at a time on to the conveyor 17. A timer 70 times the application of pressure and vacuum to the various pneumatic devices.

FIG. 41 is a simplified side view and is similar to the side views in FIGS. 5 and 19. The carriage 34' is shown mounted on the rod supports 38. The lower support structure 45' supports an air cylinder 41'. Vertical adjustment may be obtained through the hand wheel 79. The applicator mechanism is much the same as the one shown in FIG. 7 where a decoration is applied to the rim of a container. For this reason the showing in FIG. 42 has been limited to the lower portion of the mechanism shown in FIG. 7, the parts being broken away slightly above the plate 90. The air cylinder 85, not shown in FIG. 42 but shown in FIG. 7, operates the piston rod 83 to raise and lower the applicator head 82. The applicator head is bolted to the flange 230 of a member 231 which is threaded to the end 232 of the piston rod 83. A lock nut 234 prevents loosening. A collar and arm 235 bolted on one side to the piston rod 83 and having a pin 236 secured to its other end and extending up through an opening or bearing in the plate 90 prevents rotation of the piston rod 83.

As described with respect to FIG. 7 the head 82 is raised and lowered, when the carriage supports it above the path of the containers on the table, to apply a backer of the type shown in FIG. 36 to the bottom of the dish. As shown more particularly in FIG. 1 and likewise in FIGS. 5 and 19 a backer feed supplies backers so that they may be picked up by the head 82' when the carriage is moved to a position where the head 82' registers with the head for supporting a backer on the backer feed 145.

A vacuum conduit 237 extends vertically and centrally of the head 82' for applying a vacuum which will hold a backer on the bottom of the head. Preferably, the surface of the head 82' is covered by rubber or other resilient material to apply a resilient pressure.

Figure 42:
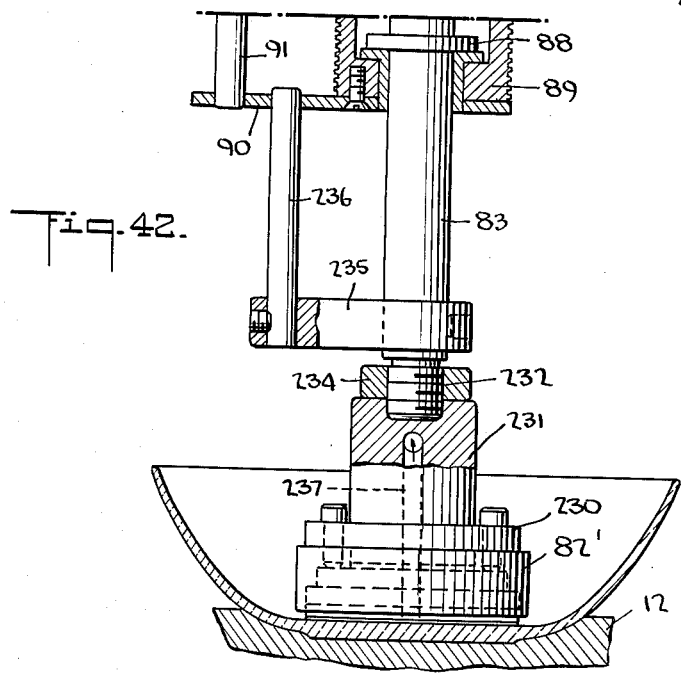
FIG. 42 is a sectional view illustrating the lower end of a mechanism for applying a backer to the bottom of a dish.

Frequently it is desirable to apply a decoration to the bottom utilizing a stamp to which a liquid decorating material has been applied. In FIG. 39 a construction is shown identical with the structure in FIG. 42 with the exception that the head 82" has a stamp on the bottom which may be made of suitable material for applying a decoration to the bottom of the dish. No vacuum is applied to the head in this instance and hence the vacuum conduit 237 shown in FIG. 42 is not a part of the embodiment.

With respect to the application of backers to the bottom of glass articles it may be necessary or desirable to apply additional pressure in a second step to force out any trapped air and to obtain the best possible adherence to the glass of the color decoration. Likewise, in the application of a liquid decorating material as described with respect to FIG. 2 it may be necessary or desirable to have a second stamp similar to 82' engage the wet design and spread it to make it more uniform and more effective.

Figure 43:
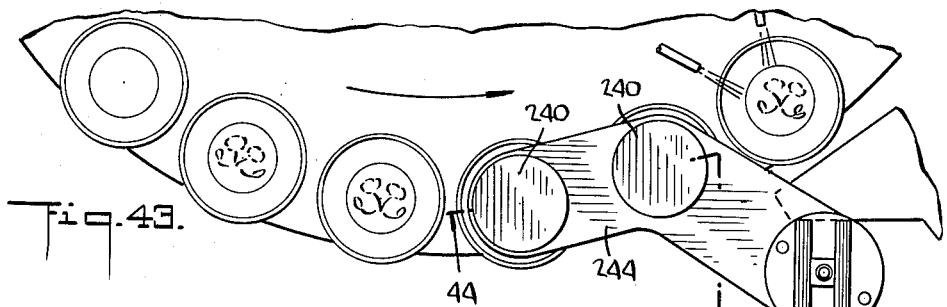
FIG. 43 is a top plan view illustrating a mechanism for applying pressure to the backers after they have been applied to press out air bubbles and to obtain a better adherence.
Figure 44:
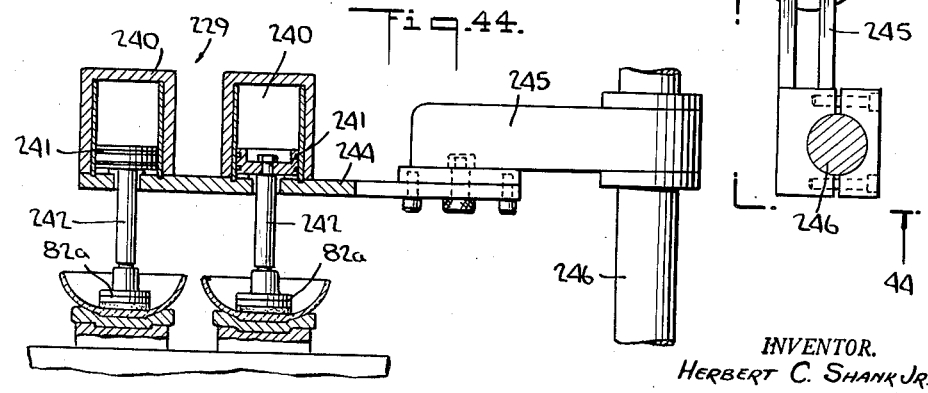
FIG. 44 is a sectional view along the line 44—44 of the mechanism in FIG. 43.

For this purpose there is shown in FIG. 43 a pair of air cylinders 240 with the usual conduit not shown for supplying compressed air to the top and bottom of each cylinder and a piston 241 with a piston rod 242 connected to a pressure head 82a.

This pair of cylinders are mounted on a plate 244 bolted at one end of a bracket 245 on a vertical support rod 246. Where the use of the pressure cylinder is not needed this mechanism may be readily removed from the machine.

ARTICLE TURNING

Figure 45:
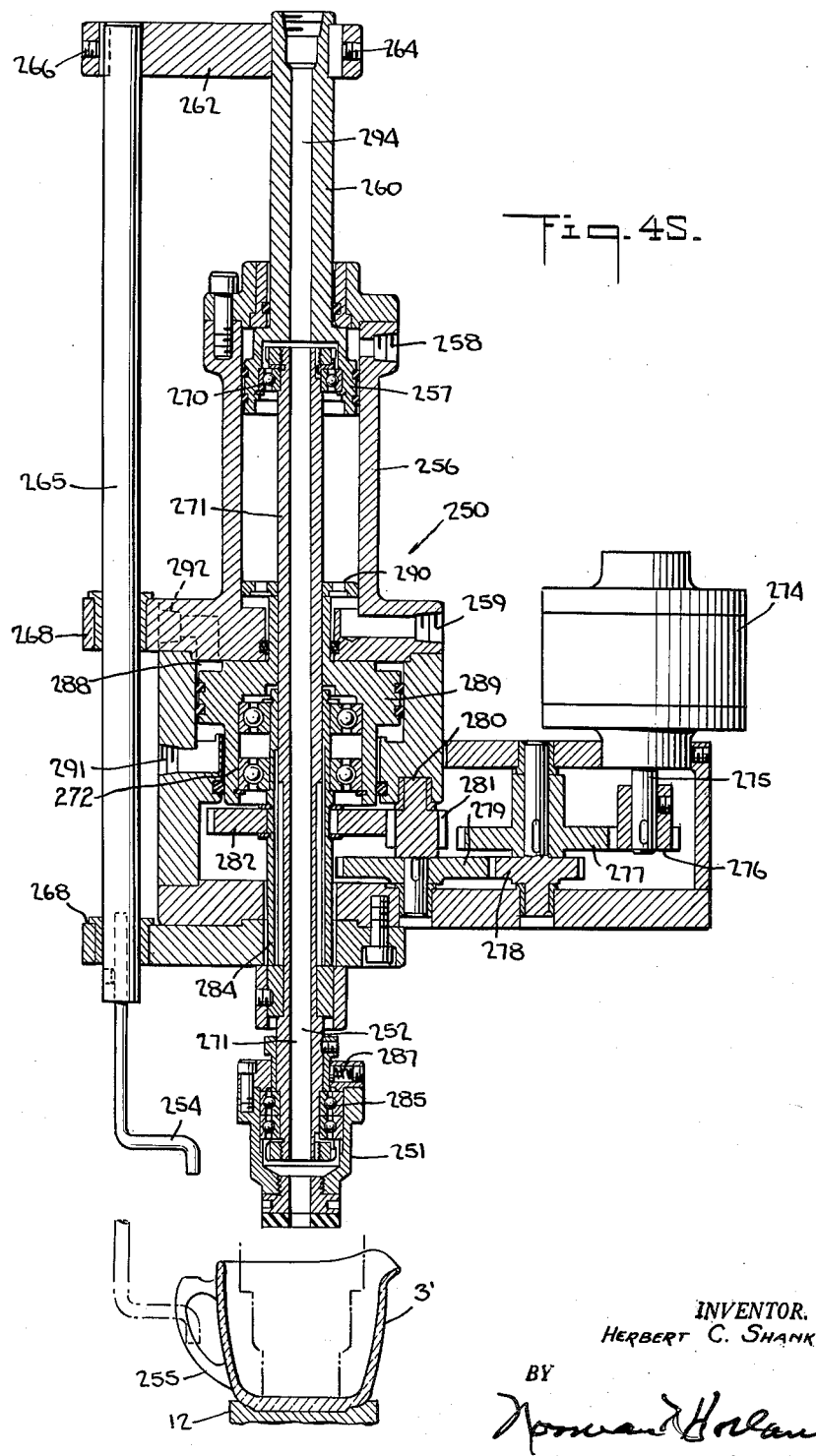
FIG. 45 is a sectional view of a mechanism for rotating or turning articles having appendages or other irregularities so that the design decorations will be properly located with respect to such appendages.

Some glass articles such as pitchers, cups and the like have handles or other parts which require that they be in a particular position with reference to the decorating mechanism, as the decoration should have definite position with respect to the handle of a cup, for example. A preferred embodiment of the mechanism for turning articles to orient them with respect to the decorating mechanism is shown more particularly in FIGS. 3 and 45. A pair of such turning mechanisms 250 are shown in FIG. 3 positioned on the table 14 about 90° from the transfer station which delivers the articles to the table. The details of each of the pair of turning mechanisms are shown in the sectional view in FIG. 45 taken along the line 45—45 of FIG. 3.

The operation of the mechanism is to lower a head 251 into a container 3', apply a vacuum through a conduit 252, raise the container 3' so that it can freely rotate and stop the rotation by an abutment member 254 which engages the handle 255 or the other irregular part of the article to stop rotation of the article at a predetermined point whereby all the articles face in the same direction. To achieve these results there is provided an air cylinder 256 having a piston 257 therein and having air pressure connections 258 at the upper end of the cylinder and 259 at the lower end of the cylinder. The upper end of the piston 257 has integral therewith a hollow rod 260 with an arm 262 secured by a set screw 264 to its upper end. The opposite end of the arm 262 is secured to the vertical member 265 by a set screw 266. The lower end of the rod 265 is attached to the bent member or wire 254 which engages the handle 255 of the cup 3'. When the piston 257 moves down, the member 265 mounted in the guides 268 will move the bent member 254 to the level of the cup handle.

In order to raise and rotate the cup the piston 257 has a ball bearing 270 therein carrying the upper end of a hollow rod 271 which is also mounted in ball bearings 272 near its middle. At its lower end the rod 271 carries the head 251. The hollow rod 271 is rotated continuously in the bearing 270 and 272 by an air motor 274 through the intermediation of the motor shaft 275 and a train of gears. The first gear 276 and the motor shaft mesh with a second gear 277 of a stub shaft which also carries a gear 278 meshing with gear 279 on a stub shaft 280 having a gear 281 meshing with gear 282 on a sleeve 284 attached to the hollow rod 271. Thus the hollow rod 271 is rotated continuously.

The lower end of the hollow rod 271 carries a ball bearing 285 having a head 251 mounted thereon. A spring 287 applies a desired friction between the head 251 and the shaft 271 so that the head 251 will rotate on the bearing 285 through the intermediation of the spring 287. In fact, the bearing alone has sufficient friction to rotate the cup after it is raised from its support and hence the spring is not essential.

In order to raise the cup after the bottom has been engaged by the head 255 a second air cylinder 288 is provided having a piston 289 carrying ball bearings 272 attached to a member 290 in the cylinder 265. The second cylinder 288 has compressed air connections 291 at its lower end and 292 at its upper end. It will be noted that the piston 289 is substantially larger than the piston 257 in the upper cylinder. When the head 251 engages the bottom of the container 3' vacuum is applied through the conduit 294 to hold the container on the end of the head.

At this time, air is supplied by the timer to the lower end of the second cylinder 288 which raises a piston 289 therein together with the supporting member 290 in cylinder 256. This will occur because the cylinder 288 is larger than the cylinder 256 and hence the piston 289 in the larger cylinder will overcome the pressure applied by the piston 257 in the smaller cylinder 256. Thus, the rod 271 will be raised slightly together with the head 251 engaging the bottom of the pitcher 3'. As soon as the pitcher is raised slightly from its support, it is free to rotate. Hence, the head 51 which has been previously slipping on its mounting will receive rotating force through the ball bearings of its mountings or through spring 287 to rotate the pitcher 3' until the handle 255 of the pitcher engages the wire or stop 254 whereupon the head 251 will again slip on its mounting so that the pitcher will remain in its oriented position. The piston 289 in cylinder 288 is then lowered placing the picker on the seat 12 at which time the vacuum is relieved in the conduit 294 and the head is raised to the position shown in the full lines in FIG. 25 by admitting air to the lower end of piston 256. By having two orienting mechanisms as described above, two cups may be rotated simultaneously so that the handles face in the same direction, when the cups reach the decorating mechanism. When symmetrical articles are decorated, the turning operation is not needed. However, the two mechanisms for turning articles may remain on the machine for convenience without being operated.

OPERATION

The operation of the several mechanisms have been given in the descriptions of the embodiments and further summarizing is believed unnecessary.

Embodiments have been illustrated to apply decorations to the rims of glass articles, to the bottoms thereof, and to one or both sides thereon, for the purpose of illustrating the versatility of the preferred embodiment of the machine and of the invention.

It will be seen that the present invention provides a machine and method for decorating glass articles which may be utilized in a commercial glass line commonly used in the mass production of glassware, without slowing the speeds of other machines in the line. In this way, the cost of decorating is reduced to a minimum and the speed of producing decorated glass articles is the same as the speed of producing glass articles without decorations. In addition, the residual heat of the glass is utilized in decorating the ware, and partially heated glass articles are delivered to the lehr. A single lehr is utilized for fusing the design on the article and also for annealing. The machine may be used for a number of types of decorations by changing or adjusting the decorating mechanisms for the machine. The preferred embodiment of the machines is simple in construction, easy to operate, and employs pneumatically operated mechanisms which are preferred in glass factories.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a rotary table type machine for applying decorations to glass articles, a decorating head having decoration gripping means, means for placing a glass article beneath said decorating head, means for positioning a stack of decorations adjacent said decorating head, a decoration take-off member slidably mounted adjacent said stack for removing a decoration from said stack and placing it in a transfer position, means for moving said decorating head into vertical superposition relative to said take-off member in said transfer position, means responsive to said movement of the decorating head to operate the decoration gripping means to grip said decoration from said take-off member, and means for moving said decorating head to a position over said glass article to apply said decoration to said article.

2. A machine as claimed in claim 1, wherein said frame has a vertically positioned air cylinder mounted thereon, a piston having a piston rod extending therefrom mounted within said air cylinder, said decorating head being located at the end of said piston rod, and wherein means are provided for lowering said piston and decorating head to permit the gripping means to grasp said decoration, and means are provided for lowering said piston rod and decorating head to apply the decoration to said article.

3. A machine as claimed in claim 1, wherein said decorating head is mounted on an arm pivotally connected to the frame and wherein means are provided to rotate the arm to bring the decorating head into said vertical superposition relative to said take-off member in said transfer position to permit the decorating head to remove the decoration from the take-off mechanism and wherein means are provided for rotating the arm to bring its decorating head into contact with the article to apply the decoration to the article.

4. A machine as claimed in claim 3, wherein an article hold-down member is operatively associated with said arm and wherein means are provided for lowering said hold-down member into engagement with the article to hold the article firmly during the decorating operation.

5. A machine as claimed in claim 3, wherein said take-off member has a vacuum head to permit it to remove a decoration from the stack.

6. A machine as claimed in claim 5, wherein said decorating head is provided with vacuum means for gripping a decoration.

7. A machine as claimed in claim 6, wherein said decoration comprises a backer with a ceramic coating and wherein blower means are provided to remove said backer from the decoration after it is applied to the glass article.

8. In a decorating machine, the combination of a rotatable table having a plurality of seats thereon for holding glass articles having handles, means for depositing said glass articles on said seats, continuously rotating drive means mounted on said machine, means for raising said glass articles successively from said seats, means for coupling said raising means and said rotating means to rotate the raised article, an abutment on said machine for engagement by the handle of said rotating article to stop the rotation thereof at a predetermined point whereby all the articles successively face in the same direction, and means for applying decorations successively to said faced articles in uniform spaced relationship to the handles thereof.

9. In a decorating machine, the combination of a rotatable table having seats thereon for supporting glass articles, a vertically mounted air cylinder having a piston therein, a rotatable sleeve operatively connected to said piston, a head rotatable with respect to the sleeve mounted at the end of said piston, rotatable means for lowering the piston in said cylinder to cause said head to engage the bottom of an article, means for continuously rotating the sleeve head, means for raising the head and the glass article to permit the head to rotate freely on its mounting, means for engaging the glass article to stop its rotation at a predetermined point, and means for applying a decoration to said article after it has stopped rotating.

References Cited in the file of this patent

UNITED STATES PATENTS

| | | |
|---|---|---|
| 2,066,351 | Johnson et al. | Jan. 5, 1937 |
| 2,067,949 | Rez | Jan. 19, 1937 |
| 2,117,618 | Malocsay | May 17, 1938 |
| 2,264,499 | Bair | Dec. 2, 1941 |
| 2,438,514 | Miller | Mar. 30, 1948 |
| 2,511,180 | Simmonds | June 13, 1950 |
| 2,545,396 | Wahl | Mar. 13, 1951 |
| 2,647,337 | Martin | Aug. 4, 1953 |
| 2,667,003 | Von Hofe | Jan. 26, 1954 |

FOREIGN PATENTS

| | | |
|---|---|---|
| 787,481 | Great Britain | Dec. 11, 1957 |